United States Patent
Mo

(10) Patent No.: US 9,362,670 B2
(45) Date of Patent: Jun. 7, 2016

(54) CHARGE CONNECTOR LOCKING APPARATUS

(75) Inventor: Jung-Hyuk Mo, Incheon (KR)

(73) Assignee: KOREA ELECTRIC TERMINAL CO., LTD., Incheon (KR)

(*) Notice: Subject to any disclaimer, the term of this patent is extended or adjusted under 35 U.S.C. 154(b) by 195 days.

(21) Appl. No.: 14/123,800

(22) PCT Filed: May 31, 2012

(86) PCT No.: PCT/KR2012/004288
§ 371 (c)(1),
(2), (4) Date: Dec. 4, 2013

(87) PCT Pub. No.: WO2012/169743
PCT Pub. Date: Dec. 13, 2012

(65) Prior Publication Data
US 2014/0111144 A1    Apr. 24, 2014

(30) Foreign Application Priority Data

Jun. 8, 2011    (KR) .................. 10-2011-0055258
Nov. 29, 2011   (KR) .................. 10-2011-0126291

(51) Int. Cl.
*H01R 13/627*   (2006.01)
*H01R 13/639*   (2006.01)
*B60L 11/18*    (2006.01)

(52) U.S. Cl.
CPC .......... *H01R 13/639* (2013.01); *B60L 11/1805* (2013.01); *B60L 11/1818* (2013.01); *H01R 13/6392* (2013.01); *B60L 2270/32* (2013.01); *B60L 2270/34* (2013.01); *Y02T 10/7005* (2013.01); *Y02T 10/7072* (2013.01); *Y02T 90/14* (2013.01)

(58) Field of Classification Search
CPC .............. H01R 13/639; H01R 13/6392; B60L 11/1818; B60L 11/1805; B60L 2270/34; B60L 2270/32; Y02T 10/7005; Y02T 90/14; Y02T 10/7072
USPC ......................................................... 439/352
See application file for complete search history.

(56) References Cited

U.S. PATENT DOCUMENTS 5,490,790 A * 2/1996 Okada ................ H01R 13/4538
                                                    439/141
5,751,135 A    5/1998 Fukushima et al.

FOREIGN PATENT DOCUMENTS

JP    2003-059587 A    2/2003
KR    10-0803526 B1    2/2008

* cited by examiner

*Primary Examiner* — Javaid Nasri
(74) *Attorney, Agent, or Firm* — Novick, Kim & Lee, PLLC; Jae Youn Kim

(57) ABSTRACT

The present invention relates to a charging connector locking apparatus. The apparatus includes a coupling latch installed in an inlet housing of the inlet connector to be supported by a resilient member so as to be rotatable by a predetermined angle, and having an interlocking curved surface by which a tip end of the plug latch is guided; a fixing rod moved to be positioned at a side of the coupling latch facing the plug latch to prevent movement of the plug latch in a release direction; and a driving source for providing driving power for movement of the fixing rod.

11 Claims, 19 Drawing Sheets

CHARGE CONNECTOR LOCKING APPARATUS

CROSS-REFERENCE TO RELATED APPLICATIONS

This application is a 371 application of PCT/KR2012/004288 filed May 31, 2012, which claims priority to Korean Patent Applications 10-2011-0055258, filed Jun. 8, 2011, and 10-2011-0126291, filed Nov. 29, 2011, the disclosures of which are incorporated herein by reference in their entireties.

BACKGROUND OF THE INVENTION

1. Field of the Invention

The present invention relates to a charging connector locking apparatus, and more particularly to a charging connector locking apparatus that locks a state in which a plug connector for charging a battery of a vehicle and an inlet connector are coupled to each other to maintain the coupled state during the charging of the battery.

2. Description of the Prior Art

An inlet connector for charging is provided at one side of a vehicle that uses electricity as main power or as at least a part of main power. A plug connector of a charging station is inserted into and coupled to the inlet connector. The plug connector is coupled and electrically connected to the inlet connector to supply electric power to a battery of a vehicle so as to charge the battery. An example of the inlet connector and the plug connector is illustrated in FIG. 1 of Japanese Patent No. 1995-85926.

Generally, the inlet connector and the plug connector are prevented from being arbitrarily released by an unintended external force with a coupling structure, but the coupling structure may be easily released through manipulation of a person. Thus, the plug connector may be released and separated from the inlet connector by a mistake or an ignorance of an operator or a third person during the charging operation. By doing so, the plug connector may generate a spark in the process of separating the plug connector from the inlet connector, causing a fire.

In order to prevent the situation, it is preferable that a locking apparatus for locking the coupled state is provided in the inlet connector. Generally, a standard structure is provided in the inlet connector and the plug connector such that they can be coupled to each other even if they are produced by different manufacturers. Thus, the automobile manufacturers want to lock the coupled state by providing a locking apparatus to a vehicle even when the plug connector and the inlet connector are not provided with a locking apparatus.

SUMMARY OF THE INVENTION

Accordingly, the present invention has been made in an effort to overcome the above problems, and it is an object of the present invention to provide a locking apparatus for locking a plug connector coupled to an inlet connector for charging of a vehicle.

In order to accomplish this object, there is provided a charging connector locking apparatus for locking a coupled state of an inlet connector and a plug latch of a plug connector of a charging station when the inlet connector is coupled to the plug connector for charging, the apparatus including: a coupling latch installed in an inlet housing of the inlet connector to be supported by a resilient member so as to be rotatable by a predetermined angle, and having an interlocking curved surface by which a tip end of the plug latch is guided; a fixing rod moved to be positioned at a side of the coupling latch facing the plug latch to prevent movement of the plug latch in a release direction; and a driving source for providing driving power for movement of the fixing rod.

The driving source is operated for a predetermined time period after the coupling of the inlet connector and the plug connector is completed and the charging is completed.

The interlocking curved surface of the coupling latch is formed along a movement direction of the plug latch, and has a tip end and a rear end with respect to a vertex, the tip end guides the plug latch when the plug latch is inserted, and the rear end guides the plug latch when the plug latch is retreated to rotate the coupling latch.

The driving source is located at one side of a mounting plate formed in the inlet housing of the inlet connector.

An adapter bracket is provided along a periphery of a mounting plate of the inlet housing, a bracket body of the adapter bracket is formed along a periphery of the mounting plate to have a predetermined height, a penetration part through which a plug insertion part of the inlet housing is exposed passes through a center of the bracket body, and a mounting piece for mounting the adapter bracket to a panel of the vehicle is formed at one side of the bracket body.

A driving source housing in which the driving source is positioned is integrally formed at one side of the adapter bracket, and the fixing rod passes through the bracket body to communicate an interior of the driving source housing with the penetration part.

A mounting piece for mounting the adapter bracket to a panel of the vehicle is formed at one side of the bracket body.

A rod guide for guiding movement of the fixing rod is formed in the penetration part of the bracket body, and a rod through-hole passes through the bracket body to communicate the rod guide and an interior of the driving source housing.

An upper surface of the latch body forming a frame of the coupling latch is a planar surface, a lower surface of the latch body on which the interlocking curved surface is formed is inclined from a tip end of the latch body such that a thickness thereof becomes thicker as it goes from a tip end to a rear end of the latch body, and a positioning surface on which a tip end of the fixing rod is positioned is formed on one surface of the latch body.

A support end protrudes from an upper surface of the latch body adjacent to the positioning surface such that if a force is applied to the latch body by the plug latch, a tip end of the fixing rod is supported between the support end and the mounting plate of the inlet housing.

The fixing rod is connected to the driving source through a connection member, a tip end pushing part positioned on the positioning surface of the latch body is provided at a tip end of the fixing rod, a connection member having a slot connected to the connection member is formed at a rear end of the fixing rod, and a tip end of the fixing rod has a cross-section smaller than a cross-section of the rear end of the fixing rod.

In accordance with another aspect of the present invention, there is provided a charging connector locking apparatus for locking a state in which a plug latch of a plug connector is coupled to an inlet connector when the inlet connector is coupled to the plug connector for charging, the charging connector locking apparatus including: a coupling latch rotated while overcoming a resilient force of a resilient member and located adjacent to the plug latch due to an entry of the plug latch; and a fixing rod, a tip end of which is positioned at one side of the coupling latch such that the coupling latch is rotated by the plug latch and maintains a state in which the coupling latch is located adjacent to the plug latch to stop an operation of the plug latch.

The charging connector locking apparatus further includes a driving source for providing driving power for movement of the fixing rod.

The driving source is located at one side of the mounting plate formed in the inlet housing of the inlet connector, and the driving source is operated for a predetermined time period in a state in which the coupling of the inlet connector and the plug connector is completed and in a state in which the charging is completed.

The coupling latch is rotatably installed in a rotary shaft supported by the inlet housing to be supported by the resilient member.

An interlocking piece extends from one side of the latch body forming a frame of the coupling latch to be downwardly inclined toward the plug connector, a positioning surface on which a tip end of the fixing rod is positioned is provided on one surface of the latch body, and an entry space into which a tip end of the plug latch inserted is provided at a lower portion of the latch body.

A support end protrudes adjacent to the positioning surface of the coupling latch such that when the plug latch is not introduced, the support end prevents the fixing rod from being positioned on the positioning surface.

The fixing rod extends in a direction parallel to a rotation center axis of the coupling latch, is guided along one side of the inlet housing, and is supported by a support formed in the inlet housing.

A catching step by which a tip end of the plug latch is caught protrudes from the inlet housing of the inlet connector at a location adjacent to the coupling latch, and guide ribs are provided at opposite ends of the catching step.

An adapter bracket is provided along a periphery of a mounting plate of the inlet housing.

A bracket body of the adapter bracket is formed along a periphery of the mounting plate to have a predetermined height, a penetration part through which a plug insertion part of the inlet housing is exposed is formed to pass through a center of the bracket body, and a mounting piece for mounting the adapter bracket to a panel of the vehicle is formed at one side of the bracket body.

A driving source housing in which the driving source is positioned is integrally formed at one side of the adapter bracket, and the fixing rod passes through the bracket body to communicate an interior of the driving source housing with the penetration part.

In accordance with another aspect of the present invention, there is provided a charging connector locking apparatus for locking a state in which a plug latch of a plug connector is coupled to an inlet connector when the inlet connector is coupled to the plug connector for charging, the charging connector locking apparatus including: a coupling latch rotated while overcoming a resilient force of a resilient member to be located adjacent to a tip end of the plug latch due to an entry of the plug latch, and rotated about a rotary shaft by a restoring force of a resilient member in a state in which the plug latch is not introduced to be located at a location where an operation of the plug latch is not hindered; a fixing rod, a tip end of which is positioned at one side of the coupling latch such that the coupling latch is rotated by the plug latch and maintains a state in which the coupling latch is located adjacent to the plug latch to stop an operation of the plug latch; and a driving source for providing driving power for moving the fixing rod for a predetermined time period in a state in which the coupling of the inlet connector and the plug connector is completed and in a state in which the charging is completed.

A catching step by which a tip end of the plug latch is caught protrudes from the inlet housing of the inlet connector at a location adjacent to the coupling latch, and guide ribs are provided at opposite ends of the catching step.

The coupling latch is rotatably installed in a rotary shaft supported by the inlet housing to be supported by the resilient member, an interlocking piece extends from one side of the latch body forming a frame of the coupling latch to be downwardly inclined toward the plug connector, a positioning surface on which a tip end of the fixing rod is positioned is provided on one surface of the latch body, and an entry space into which a tip end of the plug latch inserted is provided at a lower portion of the latch body.

A support end protrudes adjacent to the positioning surface of the coupling latch such that when the plug latch is not introduced, the support end prevents the fixing rod from being positioned on the positioning surface.

An adapter bracket is provided along a periphery of a mounting plate of the inlet housing.

A bracket body of the adapter bracket is formed along a periphery of the mounting plate to have a predetermined height, a penetration part through which a plug insertion part of the inlet housing is exposed passes through a center of the bracket body, and a mounting piece for mounting the adapter bracket to a panel of the vehicle is formed at one side of the bracket body.

A driving source housing in which the driving source is positioned is integrally formed at one side of the adapter bracket, and the fixing rod passes through the bracket body to communicate an interior of the driving source housing with the penetration part.

In accordance with another aspect of the present invention, there is provided a charging connector locking apparatus for locking a state in which a plug latch of a plug connector in a charging station is coupled to a latch catching step of an inlet connector when the inlet connector is coupled to the plug connector for charging, the charging connector locking apparatus including: a driving source; and a lever unit by which a locking lever operated by driving power of the driving source to be moved forward and rearward interrupts an operation of the plug latch provided in the plug connector coupled to the latch catching step.

The lever unit includes a lever housing forming an external appearance of the lever unit, a pinion gear installed within the lever housing and forwardly and reversely rotated by driving power of the driving source, and a locking lever moved forward and rearward in conjunction with the pinion gear.

A cam is formed at a lengthwise side of the locking lever, and a switch provided with a switch lever for manipulating a push button in conjunction with the cam is further provided within the lever housing to detect a forward/rearward movement completion time point of the locking lever.

The locking lever passes through a lever through-hole passing through a first panel to which the lever housing and the inlet connector are mounted and passing through a mounting plate provided in a connector housing of the inlet connector.

The driving source is operated when the plug connector is coupled to the inlet connector and a manipulation for charging or a charging completing manipulation is performed, or a control unit of the vehicle receives information indicating that the plug connector is coupled to the inlet connector or the charging is completed.

The charging connector locking apparatus according to the present invention can have the following effects.

According to the present invention, if an inlet connector provided in a vehicle for charging of the vehicle and a plug connector of a charging station are coupled to each other, a plug latch of the plug connector is caught by one side of the inlet connector, a coupling latch is located at an upper end of the plug latch to stop an operation of the plug latch, and a fixing rod pushes the coupling latch to stop an operation of the coupling latch. Thus, the plug connector can be prevented from being arbitrarily removed during the charging to safely charge the vehicle.

Further, since a driving source for forward and rearward movements of a fixing rod for stopping an operation of the coupling latch is fixed to an inlet housing of the inlet connector or an adapter bracket fixed to the inlet housing, the fixing rod is operated at a location adjacent to the coupling latch. Thus, power transmission efficiency is improved and thus operation characteristics are enhanced.

Furthermore, since an adapter bracket is used, the inlet connector can be commonly used. In addition, since a driving source is installed in the adapter bracket and a locking lever is connected to the driving source to pass through the adapter bracket, a waterproofing effect can be increased.

Furthermore, since the coupling latch can normally prevent the fixing rod from entering by using a resilient member, a malfunction of the fixing rod can be prevented.

Furthermore, since the fixing rod is moved parallel to a direction of a rotary center axis of the coupling latch and the fixing rod is guided by a mounting plate of the inlet housing, a large force can be supported even if a size of the fixing rod is relatively small. Thus, an overall size of the locking apparatus can be smaller and driving power of the driving source for operating the fixing rod can be low.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
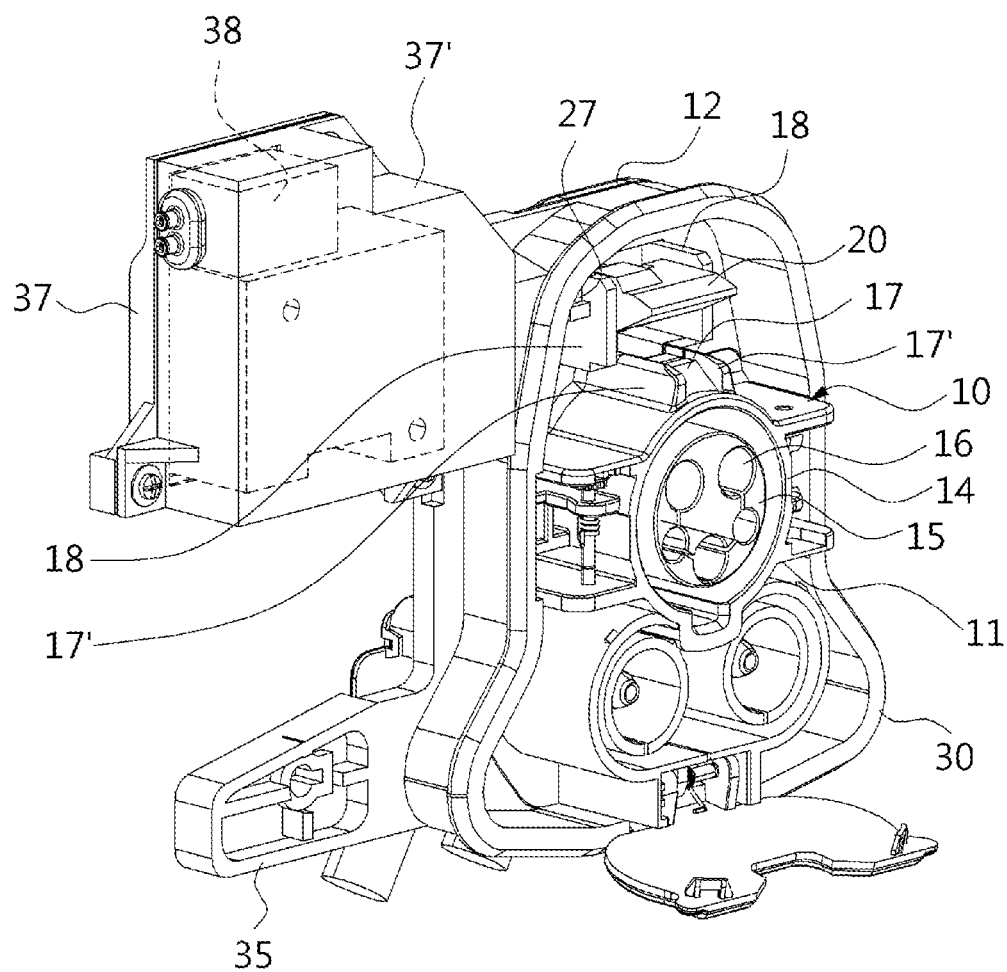
FIG. 1 is a front view illustrating an inlet connector of a charging connector locking apparatus according to an embodiment of the present invention.

Hereinafter, charging connector locking apparatuses according to embodiments of the present invention will be described in detail with reference to the accompanying drawings.

As illustrated in the drawings, an inlet connector 10 is adapted to charge a vehicle, and is a part mounted to one side of a vehicle such that a plug connector 40 of a charging station is coupled thereto. An inlet housing 11 forms an external appearance and a frame of the inlet connector 10. The inlet housing 11 is formed of a synthetic resin. A mounting plate 12 formed of an insulating synthetic resin is provided at a rear end of the inlet housing 11.

A plug insertion part 14 that is substantially cylindrical protrudes from the mounting plate 12. A terminal installation part 15 that is cylindrical is formed in an interior of the plug insertion part 14. A terminal positioning space 16 passes through the terminal installation part 15 forward and rearward. A terminal (not illustrated) formed of a conductive metal is located within the terminal positioning space 16. A catching step 17 is formed at one side of an outer surface of the plug insertion part 14. The catching step 17 is a part by which a plug latch 42 of a plug connector 40, which will be described below, is caught. Guide ribs 17' are formed side by side on outer surfaces of the plug insertion part 14 corresponding to opposite ends of the catching step 17. The guide ribs 17' are configured such that the plug latch 42 is accurately guided to the catching step 17.

Two latch support plates 18 are formed on a mounting plate 12 adjacent to the plug insertion part 14 provided with the guide ribs 17' at a predetermined separation. The latch support plates 18 protrude perpendicularly to a surface of the mounting plate 12. A coupling latch 20, which will be described below, is installed in the latch support plates 18 to be rotatable by a predetermined angle. One of the latch support plates 18 is partially cutaway to form an interlocking part 19. The interlocking part 19 is a part in which a fixing rod 27, which will be described below, is located to be moved forward and rearward. For reference, a configuration of the inlet connector 10 that does not correspond to the essence of the present invention will not be described.

Figure 4:
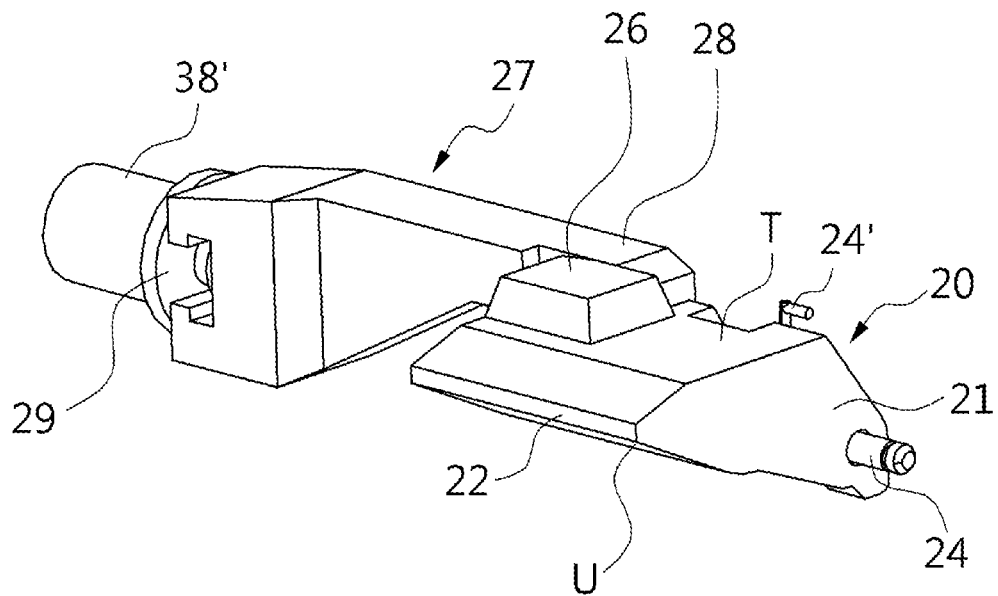
FIG. 4 is a perspective view illustrating a fixing rod and a coupling latch according to the embodiment of the present invention.
Figure 5:
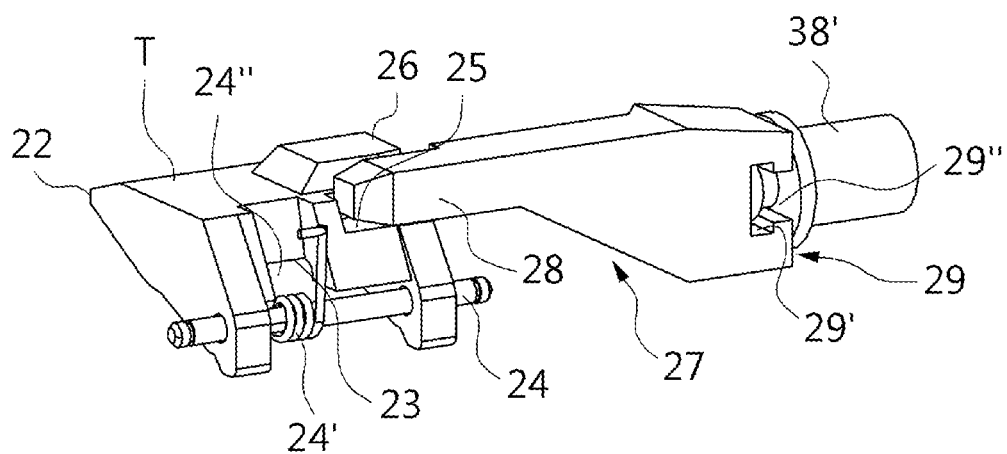
FIG. 5 is a perspective view illustrating the fixing rod and the coupling latch according to the embodiment of the present invention when viewed from a direction different from that of FIG. 4.
Figure 6:
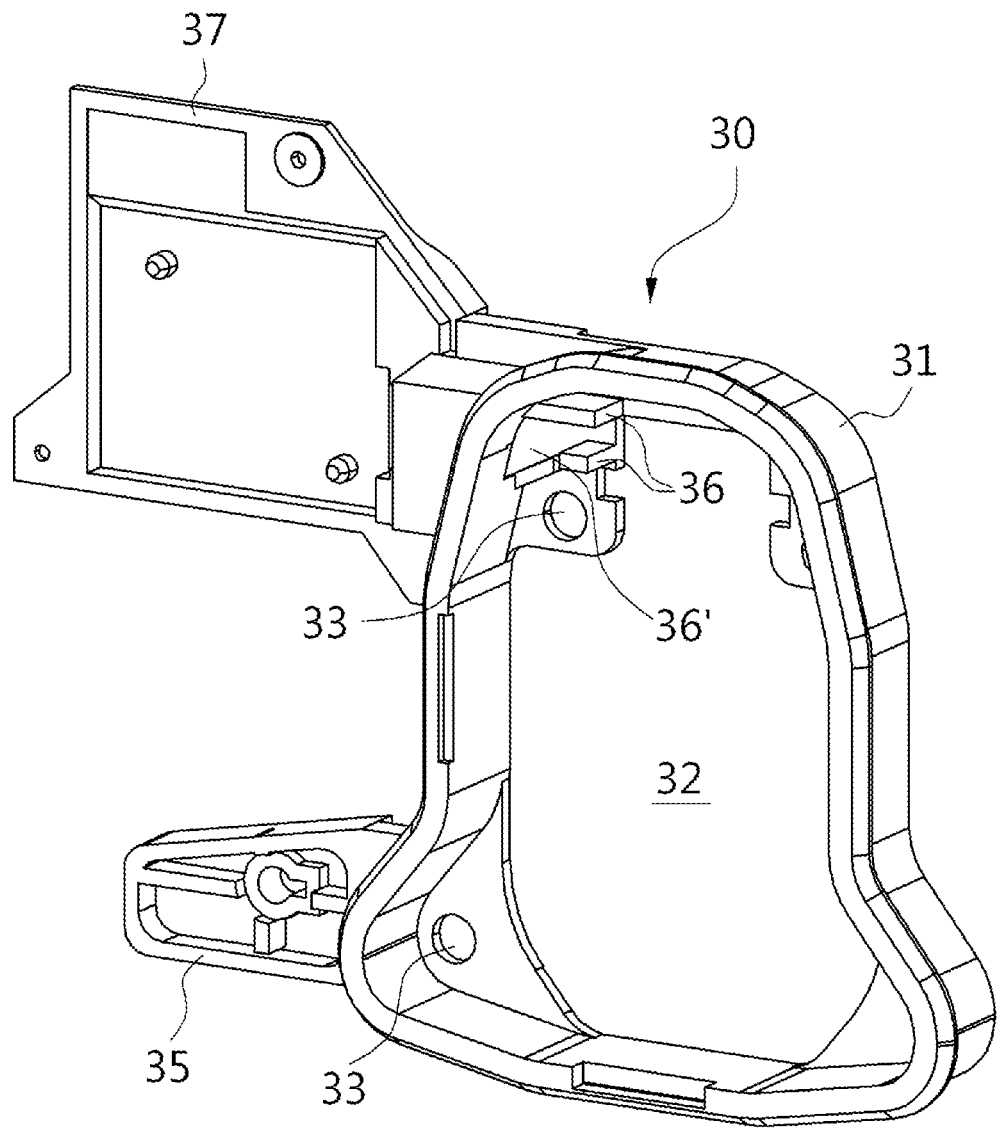
FIG. 6 is a perspective view illustrating an adapter bracket according to the embodiment of the present invention.

The coupling latch 20 is installed between the latch support plates 18 of the inlet housing 11. The coupling latch 20 serves to directly push a plug latch 42 caught by the catching step 17. As illustrated in FIGS. 4 and 5, a latch body 21 forming a frame of the coupling latch 20 has a substantially triangular cross-section when viewed from a side. A thickness of a tip end 22 of the latch body 21 becomes smaller as it goes toward the tip thereof when compared with other parts thereof.

As shown in FIG. 4, the latch body 21 has a substantially planar upper surface T, and a lower surface U of the latch body 21 is inclined from the tip end 22 of the latch body 21. As can be seen from FIG. 4, the lower surface U has an interlocking curved surface 23. The interlocking curved surface 23 extends along a central portion of the lower surface U. The interlocking curved surface 23 serves to guide a tip end of the plug latch 42, which will be described below. The interlocking curved surface 23 has a predetermined width from the tip end 22 to a rear end thereof, and may be divided into a tip end 23' and a rear end 23" with respect to a vertex thereof. The tip end 23' and the rear end 23" of the interlocking curved surface 23 are parts interlocking with a curved surface formed at a tip end of a plug latch 42, which will be described below, when the plug latch 42 is introduced and withdrawn. If a predetermined force or larger is applied to the plug connector 40 by the interlocking curved surface 23, the plug latch 42 can be moved in spite of existence of the coupling latch 20.

Figure 2:
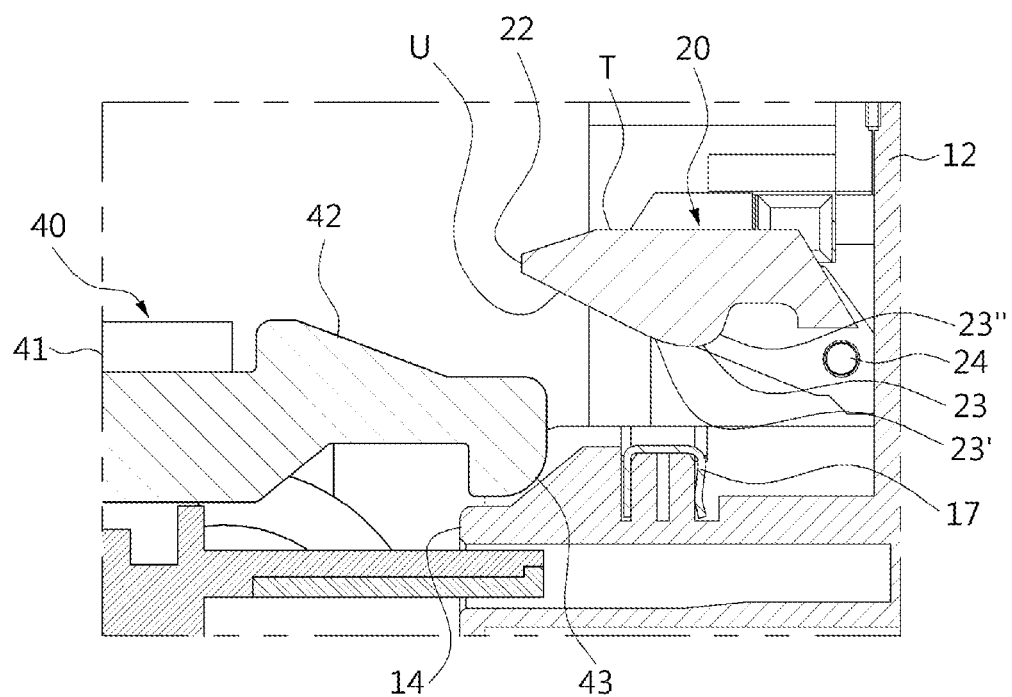
FIG. 2 is a sectional view illustrating a main part of the charging connector locking apparatus according to the embodiment of the present invention.
Figure 3:
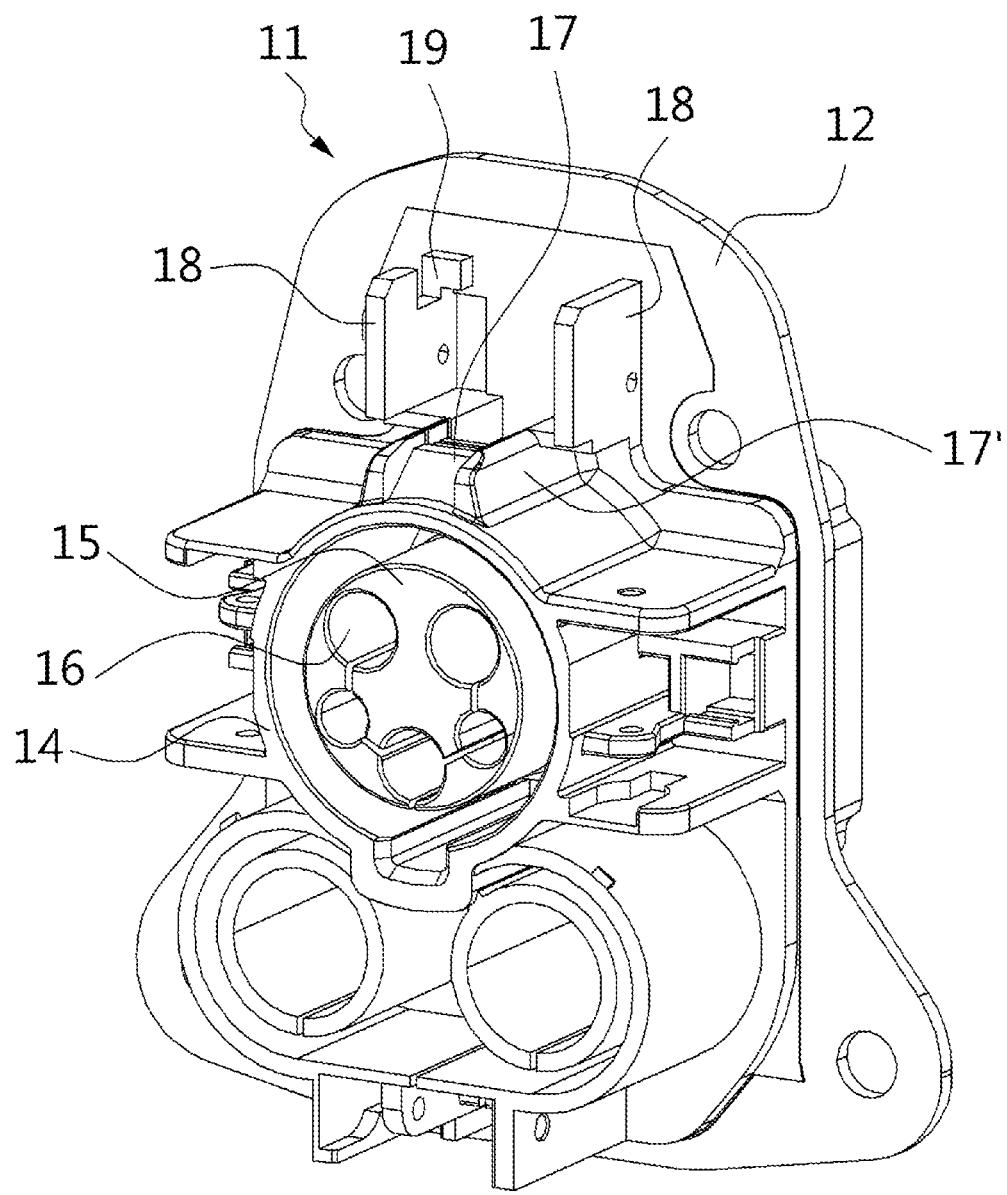
FIG. 3 is a perspective view illustrating the inlet housing according to the embodiment of the present invention.

A rotary shaft 24 passes through a rear end of the coupling latch 20 to be rotated by a predetermined angle about the rotary shaft 24. Thereto, a resilient member 24' is installed in the rotary shaft 24. One side of the resilient member 24' is supported by the coupling latch 20, and an opposite side thereof is supported by the mounting plate 12 or the inlet housing 11. The resilient member 24' may be a torsion spring. As a torsion spring is used as the resilient member 24', the coupling latch 20 comes to stand at a specific location, and the coupling latch 20 should overcome a resilient force of the resilient member 24' to be rotated in place. As illustrated in FIG. 2, a location of the coupling latch 20 is set such that the lower surface U is spaced apart from the catching step 17 by a predetermined separation.

An opening 24" is formed at a center of a rear end of the latch body 21 of the coupling latch 20. The opening 24" is formed to have a width corresponding to the width of the interlocking curved surface 23. The opening 24" passes through the latch body 21, and one side of the latch body 21, that is, a rear end of the latch body 21 is opened.

A positioning surface 25 is formed at a rear end of the upper surface T of the latch body 21. The positioning surface 25 is a planar surface in which a tip end of the fixing rod 27, which will be described below, is positioned. The positioning surface 25 corresponds to a four-sided planar surface. A support end 26 is formed adjacent to the positioning surface 25 to protrude. One surface of the support end 26 is situated at a location corresponding to one surface of a tip end of the fixing rod 27, which will be described below, such that the surface of the support end 26 is supported by the fixing rod 27 to prevent rotation of the latch body 21 when a force is applied to the coupling latch 20.

The fixing rod 27 is installed to pass through the interlocking part 19 of the mounting plate 12. A tip end pushing part 28 is provided at a tip end of the fixing rod 27, and a connection part 29 is provided at a rear end of the fixing rod 27. In the embodiment of the present invention, a cross-section of the tip end pushing part 28 is four-sided. The tip end pushing part 28 is positioned on the positioning part 25 of the coupling latch 20 to prevent rotation of the coupling latch 20. The fixing rod 27 is formed such that the tip end pushing part 28 has a relatively small cross-section and the connection part 29 at a rear end thereof has a relatively large cross-section.

A connection slot 29' transversely passing through a rear end of the fixing rod 27 is located in the connection part 29 of the fixing rod 27, and the connection slot 29' is partially opened toward a rear end of the fixing rod 27. The opened part is also referred to as an opened hole 29". A tip end of a connection member 38' of the driving source 38, which will be described below, is caught by the connection slot 29'.

The adapter bracket 30 is attached to the mounting plate 12 of the inlet housing 11 along a periphery of the front surface of the mounting plate 12 of the inlet housing 11. The adapter bracket 30 is manufactured to be suitable for various types of panels of various vehicles so as to mount the inlet connector 10 to a panel. This is because various different adapter brackets 30 can be used in the same inlet connector 10 in various types of vehicles.

The bracket body 31 forms a frame of the adapter housing 30. The bracket body 31 is formed along a periphery of the mounting plate 12 of the inlet housing 11 to have a predetermined height. A penetration part 32 is formed to pass through a center of the bracket body 31. The plug insertion part 14 is located in the penetration part 32 to be exposed.

A plurality of coupling holes 33 for coupling to the mounting plate 12 of the inlet housing 11 are formed in the bracket body 31. A mounting piece 35 is formed at one side of the bracket body 31. The mounting piece 35 is adapted to mount the adapter bracket 30 to a panel of the vehicle.

A rod guide 36 for guiding movement of the fixing rod 27 is formed in the bracket body 31. The rod guide 36 serves to guide movement of the fixing rod 27 by enclosing at least three surfaces of the fixing rod 27. A rod through-hole 36' passes through the bracket body 31 at a part where the rod guide 36 is connected to the bracket body 31. The rod guide 36 may be mounted to the mounting plate 12 of the inlet housing 11. The rod through-hole 36' serves to communicate an interior of the driving source housing 37, which will be described below, with the penetration part 32.

The driving source housing 37 is formed at one side of the bracket body 31. A driving source 38 is positioned within the driving source housing 37, and a driving source cover 37' is provided to shield the driving source housing 37 from the outside. Power of the driving source 38 installed within the driving source housing 37 is transmitted by the connection member 38' connected to the fixing rod 27 via the rod through-hole 36'.

For reference, the driving source 38 may not be installed in the bracket body 31. The driving source 38 may be mounted to the mounting plate 12 of the inlet housing 11. Thereto, the mounting plate 12 should be larger than in the illustrated embodiment. In this case, the driving source 38 is situated at a location corresponding to the penetration part 32 of the bracket body 31.

Meanwhile, in the present invention, the driving source 38 not only provides power but also includes a configuration for converting the power into a linear reciprocal movement of the fixing rod 27. For example, it is defined in the specification that the driving source 38 includes a configuration for converting rotating power of the motor into a linear movement by using a pinion and a rack.

Next, only a main part of the plug connector 40 coupled to the inlet connector 10 will be described. The plug connector 40 is provided in a charging station, and the plug housing 41 forms an external appearance of the plug connector 40. A plug latch 42 is installed in the plug connector 40. The plug latch 42 is a part that is caught by the catching step 17 of the inlet connector 10 if the operator inserts the plug connector 40 into the inlet connector 10 while holding the plug connector 40. A tip end curved surface 43 is located at a tip end of the plug latch 42. The tip end curved surface 43 is a part that is guided by the catching step 17 when the plug latch 42 is moved to be caught by the catching step 17.

Hereinafter, an operation of the charging connector locking apparatus according to the present invention will be described.

FIG. 7A illustrates a state in which the plug latch 42 of the plug connector 40 has just entered the catching step 17 of the inlet connector 10. Then, the coupling latch 20 is installed to be spaced apart from the catching step 17 by a predetermined separation by the resilient member 20'. The fixing rod 27 is already moved toward the driving source 38. In this state, if a force is applied to the coupling latch 20, the coupling latch 20 is rotated while overcoming a resilient force of the resilient member 20'.

As illustrated in FIG. 7B, if the plug connector 40 continues to move toward the inlet connector 10, a tip end curved surface 43 of the plug latch 42 is guided along the catching step 17, and a tip end of the plug latch 42 is guided along the interlocking curved surface 23, so that the coupling latch 20 is raised about the rotary shaft 24 as illustrated in the drawing.

In the state depicted in FIG. 7C shortly before the plug latch 42 is caught by the catching step 17, a tip end of the plug latch 42 is guided toward a rear end 23" of the interlocking curved surface 23 of the coupling latch 20. In the state depicted in FIG. 7D after the state depicted in FIG. 7C, the plug latch 42 is caught by the catching step 17. Then, the coupling latch 20 is also rotated to a substantially original state while the plug latch 42 goes to a relatively low position with reference to the drawing. For reference, the state depicted in FIG. 7D corresponds to a state in which the fixing rod 27 is spaced apart from the coupling latch 20. That is, the state depicted in FIG. 7D corresponds to the state depicted in FIG. 8A. In this state, a terminal of the inlet connector 10 and a terminal of the plug connector 40 are coupled to and electrically connected to each other. If the electrical coupling is accomplished, the information is transmitted to the driving source 38 to operate the driving source 38.

Figure 8:
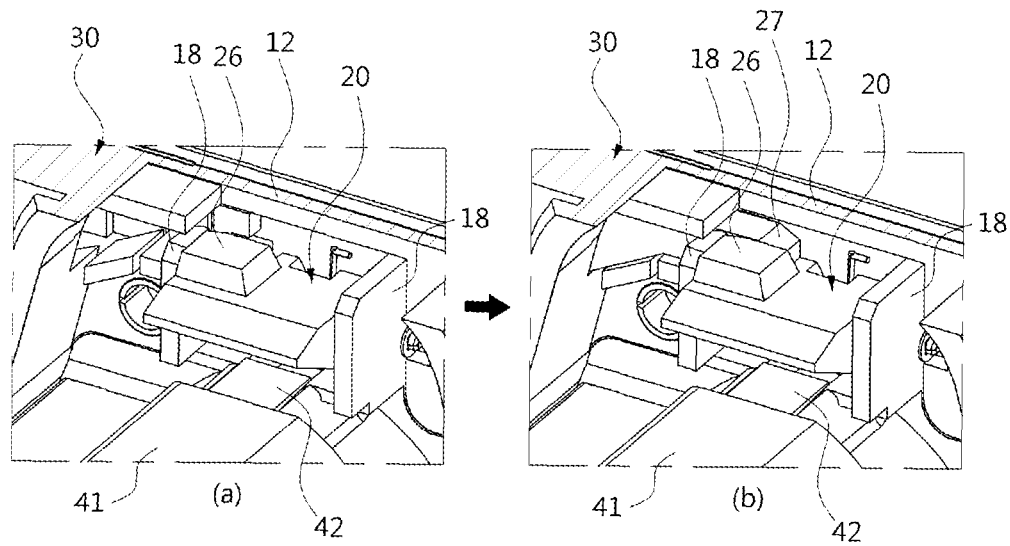
FIG. 8 is a view illustrating an operation of the fixing rod according to the embodiment of the present invention.
Figure 9:
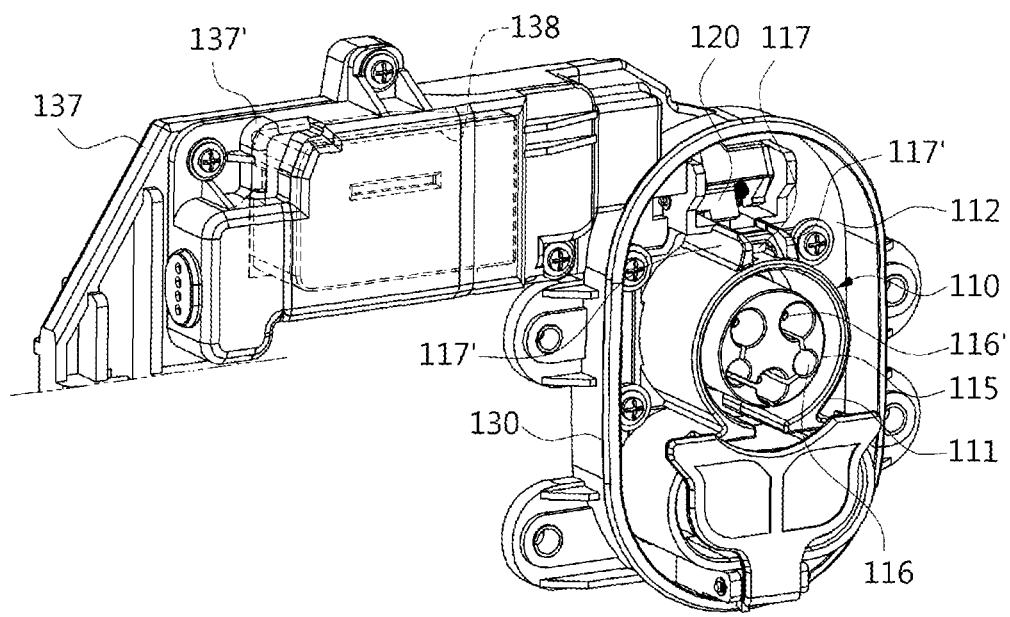
FIG. 9 is a front perspective view illustrating an inlet connector of a charging connector locking apparatus according to another embodiment of the present invention.

If the driving source 38 is operated, the fixing rod 27 is moved forward and the tip end pushing part 28 is positioned on the positioning surface 25 of the coupling latch 20 as illustrated in FIG. 8B. If the tip end pushing part 28 of the fixing rod 27 is positioned in the positioning surface 25 of the coupling latch 20, the coupling latch 20 is prevented from being rotated in a direction away from the catching step 17. In particular, since one surface of the fixing rod 27 is supported by the mounting plate 12 of the inlet housing 11 and an opposite surface thereof is supported by the support end 26 of the coupling latch 20, the coupling latch 20 is prevented from being rotated.

Here, if the coupling latch 20 cannot be rotated, the plug latch 42 cannot be withdrawn from the catching step 17. If the plug latch 42 cannot be withdrawn from the catching step 17, the plug connector 40 cannot be separated from the inlet connector 10.

Meanwhile, when the fixing rod 27 directly prevents the plug latch 42 from being withdrawn from the catching step 17 without using the coupling latch 20, a tip end of the fixing rod 27 is raised by an operation in which the plug latch 42 is withdrawn from the catching step 17. If the fixing rod 27 is raised in this way, the force can be transferred to the driving source 38. Thus, when the coupled state of the fixing rod 27 and the connection member 38' is loosened or not secure, the driving source 38 may be influenced and damaged. Thus, the coupling latch 20 maintains the coupled state of the inlet connector 10 and the plug connector 40 without influencing the driving source 38.

Meanwhile, if the charging is completed, a charging completion signal is provided. The driving source 38 is operated in response to the signal. The fixing rod 27 moves away from the coupling latch 20 by an operation of the driving source 38. If the fixing rod 27 moves away from the coupling latch 20, the coupling latch 20 becomes rotatable. That is, it corresponds to the state depicted in FIG. 8A.

Figure 7:
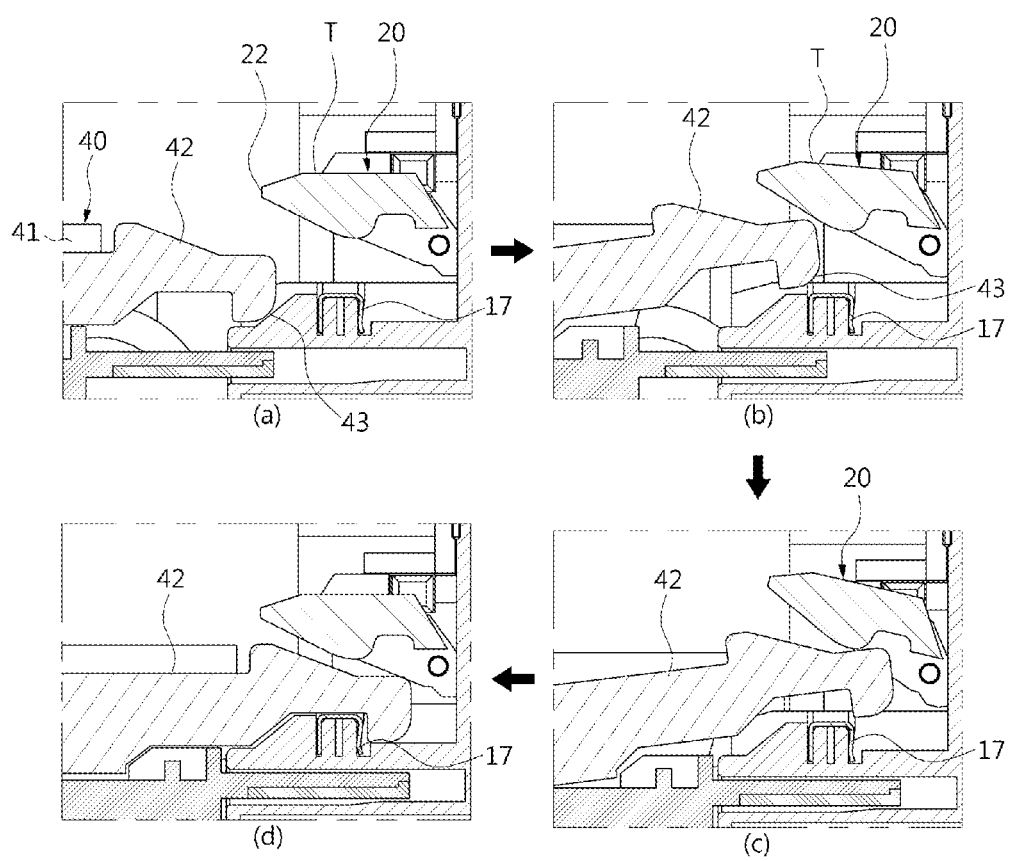
FIG. 7 is a view sequentially illustrating an operation of the coupling latch and a plug latch according to the embodiment of the present invention.

Since the coupling latch 20 can be rotated by a predetermined force or stronger in a state in which the fixing rod 27 deviates from the coupling latch 20, if the operator pushes the plug latch 42 while holding the plug connector 40, the plug latch 42 is withdrawn from the catching step 17 while the plug latch 42 and the coupling latch 20 are operated in a reverse sequence of FIG. 7 so that the plug connector 40 can be separated from the inlet connector 10.

Next, another embodiment of the present invention will be described in detail with reference to FIGS. 9 to 16.

As illustrated in the drawings, an inlet connector 110 is adapted to charge a vehicle, and is a part mounted to one side of the vehicle and to which a plug connector 140 of the charging station is coupled. The inlet housing 111 forms an external appearance and a frame of the inlet connector 110. The inlet housing 111 is formed of a synthetic resin. A mounting plate 112 formed of an insulating synthetic resin is provided at a rear end of the inlet housing 111.

A support 113 supporting a fixing rod 127, which will be described below, is formed at one side of the mounting plate 112 to protrude. The support 113 supports the fixing rod 127 within the inlet housing 111 to support a force transmitted from a coupling latch 120. The support 113 protrudes from the mounting plate 112 such that a necessary part of the fixing rod 127 can be supported.

A plug insertion part 114 that is substantially cylindrical protrudes from the mounting plate 112. A terminal installation part 115 that is cylindrical is formed in an interior of the plug insertion part 114. A terminal positioning space 116 passes through the terminal installation part 115 forward and rearward. A terminal 116 formed of a conductive metal is located within the terminal positioning space 116. A catching step 117 is formed at one side of an outer surface of the plug insertion part 114. The catching step 117 is a part by which a plug latch 142 of a plug connector 140, which will be described below, is caught. A pair of guide ribs 117' are formed side by side on outer surfaces of the plug insertion part 114 corresponding to opposite ends of the catching step 117. The guide ribs 117' are configured such that the plug latch 142 is accurately guided to the catching step 117.

Figure 11:
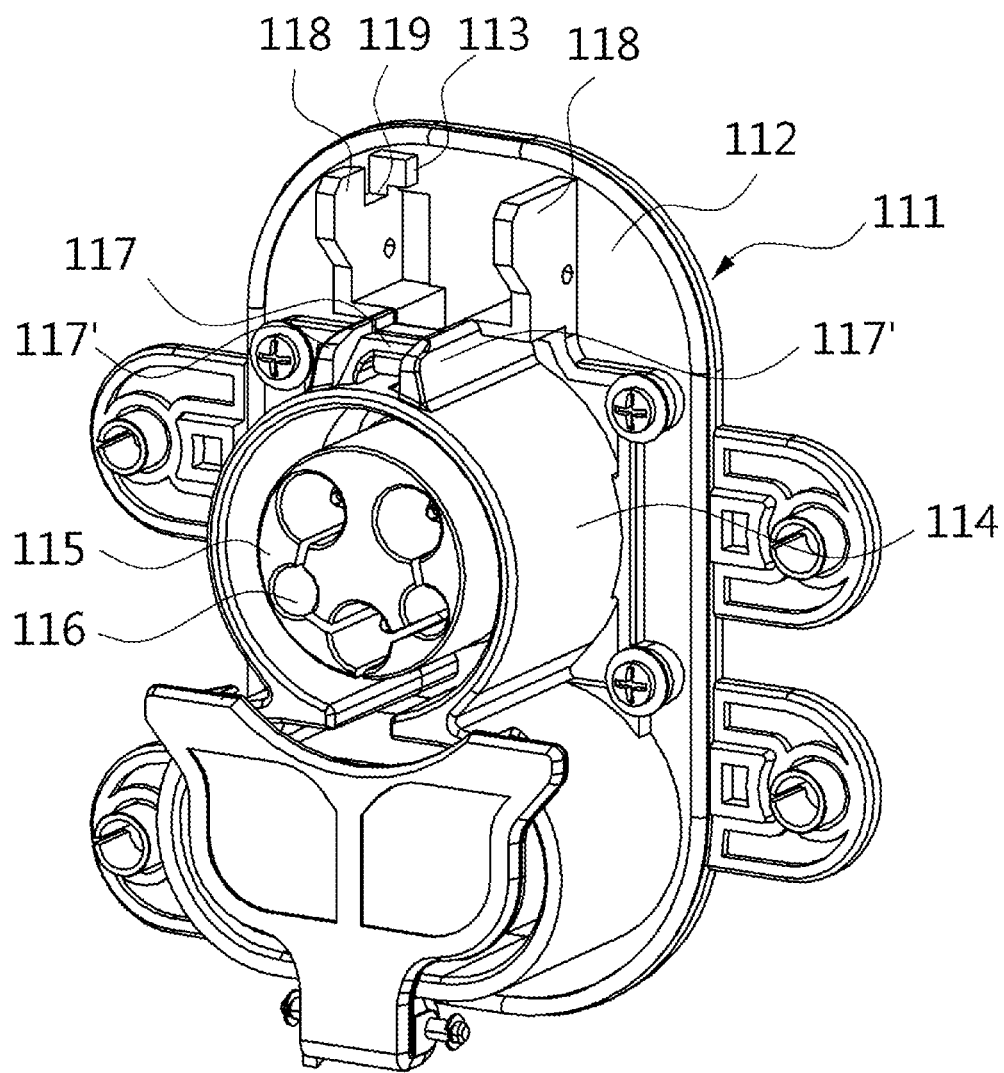
FIG. 11 is a perspective view illustrating the inlet housing according to the other embodiment of the present invention.

Two latch support plates 118 are formed on a mounting plate 112 adjacent to the plug insertion part 114 provided with the guide ribs 117' at a predetermined separation. The latch support plates 118 protrude perpendicularly to a surface of the mounting plate 112. A coupling latch 120, which will be described below, is installed in the latch support plates 118 to be rotatable by a predetermined angle. As illustrated in FIG. 11, one of the latch support plates 118 is partially cutaway to form an interlocking part 119. The interlocking part 119 is a part in which a fixing rod 127, which will be described below, is located to be moved forward and rearward. For reference, a configuration of the inlet connector 110 that does not correspond to the essence of the present invention will not be described.

Figure 12:
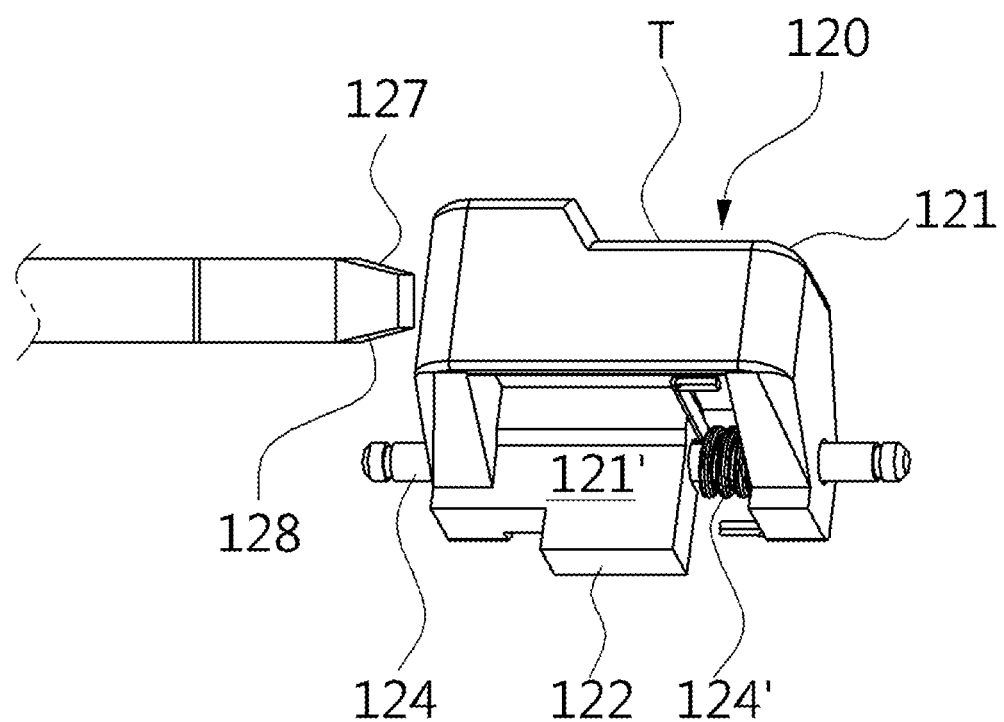
FIG. 12 is a perspective view illustrating a fixing rod and a coupling latch according to the other embodiment of the present invention.
Figure 13:
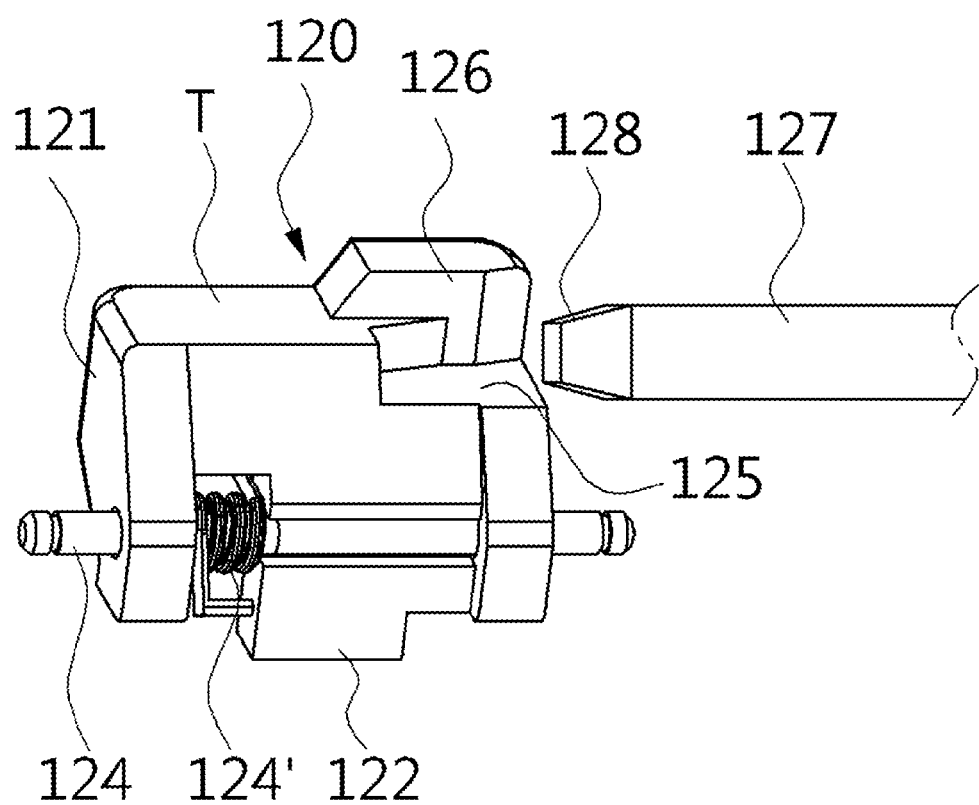
FIG. 13 is a perspective view illustrating the fixing rod and the coupling latch according to the other embodiment of the present invention when viewed from a direction different from that of FIG. 12.
Figure 14:
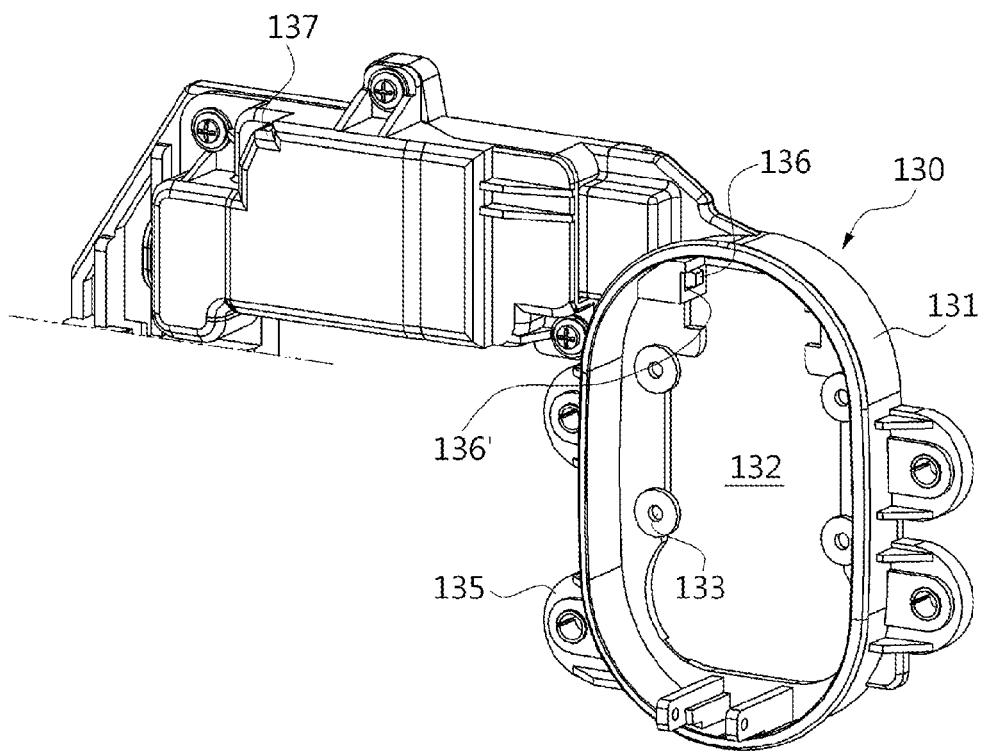
FIG. 14 is a perspective view illustrating an adapter bracket according to the other embodiment of the present invention.

A coupling latch 120 is installed between the latch support plates 118 of the inlet housing 111. The coupling latch 120 serves to directly push the plug latch 142 caught by the catching step 117. As illustrated in FIGS. 12 and 13, the latch body 121 forms a frame of the coupling latch 120. An entry space 121' is formed in an interior of a lower side of the latch body 121. The entry space 121' is opened toward a lower side and a front side of the latch body 121 such that a tip end of the plug latch 142 is located in the entry space 121'.

An interlocking piece 122 is provided to form a rear end of the entry space 121' of the latch body 121. The interlocking piece 122 extends to a lower side of the latch body 121 to contact a tip end of the plug latch 142 while facing the tip end of the plug latch 142. If the interlocking piece 122 is pushed by a tip end of the plug latch 142, the latch body 121 is rotated.

Figure 10:
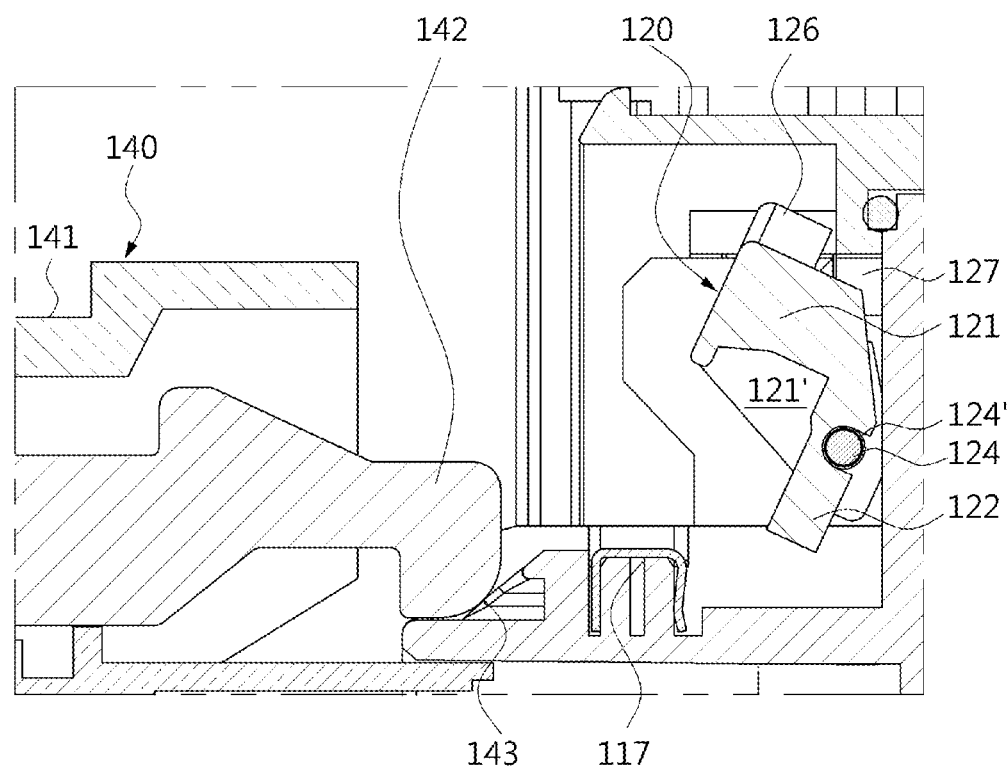
FIG. 10 is a sectional view illustrating a main part of the charging connector locking apparatus according to the other embodiment of the present invention.

As illustrated in FIGS. 12 and 13, the latch body 121 has a substantially planer upper surface T, and a widthwise central cross-section of the latch body 121 is substantially L-shaped as illustrated in FIG. 10. The shape is formed by a ceiling of the entry space 121' and the interlocking piece 122.

A rotary shaft 124 passes through the latch body 121 of the coupling latch 120, and a part through which the rotary shaft 124 passes is substantially an upper end of the interlocking piece 122. The coupling latch 120 is rotated by a predetermined angle about the rotary shaft 124. Thereto, a resilient member 124' is installed in the rotary shaft 124. One side of the resilient member 124' is supported by the coupling latch 120, and an opposite side thereof is supported by the mounting plate 112 or the inlet housing 111. The resilient member 124' may be a torsion spring. As a torsion spring is used as the resilient member 124', the coupling latch 120 comes to stand at a specific location, and the coupling latch 120 should overcome a resilient force of the resilient member 124' to be rotated in place. As illustrated in FIG. 10, the coupling latch 120 is disposed such that the interlocking piece 122 normally protrudes to be downwardly inclined toward the front side. If the coupling latch 120 is located in this way, the fixing rod 127 is normally prevented from moving toward an upper surface T of the coupling latch 120.

A positioning surface 125 is formed at a rear end of the upper surface T of the latch body 121. The positioning surface 125 is a planar surface in which a tip end of the fixing rod 127, which will be described below, is positioned. The positioning surface 125 corresponds to a four-sided planar surface. A support end 126 is formed on the upper surface T adjacent to the positioning surface 125 to protrude. One surface of the support end 126 is situated at a location corresponding to one surface of a tip end of the fixing rod 127, which will be described below, such that when the plug connector is not coupled, the fixing rod 127 is prevented from moving forward to be positioned on the positioning surface 125.

The fixing rod 127 is installed to pass through the interlocking part 119 of the mounting plate 112. The fixing rod 127 passes through the interlocking part 119, and is guided and supported by the mounting plate 112 of the inlet housing 111 at the same time. As the fixing rod 127 is guided along the mounting plate 112 in this way, a force applied through the coupling latch 120 can be endured better. That is, even if a size of the fixing rod 127 is relatively small, a relatively large force can be endured as the fixing rod 127 is supported by the mounting plate 112. That is, since the fixing rod 127 extends and is moved in a direction parallel to a rotation center axis of the coupling latch 120, the fixing rod 127 can endure a still stronger force as compared with a case in which the fixing rod 127 is installed to cross the rotation center axis of the coupling latch 120.

A tip end pushing part 128 is provided at a tip end of the fixing rod 127. A cross-section of the tip end pushing part 128 is four-sided in the embodiment of the present invention. The tip end pushing part 128 is positioned on the positioning surface 125 of the coupling latch 120 to prevent rotation of the coupling latch 120. The fixing rod 127 has a relatively small cross-section at the tip end pushing part 128, so that the fixing rod 127 can enter the positioning surface 125 more smoothly. A configuration provided at a rear end of the fixing rod 127 will not be described. A rear end of the fixing rod 127 is connected to the driving source 138, which will be described below.

The adapter bracket 130 is attached to the mounting plate 112 of the inlet housing 111 along a periphery of the front surface of the mounting plate 112 of the inlet housing 111. The adapter bracket 130 is manufactured to be suitable for various types of panels of various vehicles so as to mount the inlet connector 110 to a panel. This is because various different adapter brackets 130 can be used in the same inlet connector 110 in various types of vehicles.

The bracket body 131 forms a frame of the adapter bracket 130. The bracket body 131 is formed along a periphery of the mounting plate 112 of the inlet housing 111 to have a predetermined height. A penetration part 132 is formed to pass through a center of the bracket body 131. The plug insertion part 114 is located in the penetration part 132 to be exposed.

A plurality of coupling holes 133 for coupling with the mounting plate 112 of the inlet housing 111 are formed in the bracket body 131. A mounting piece 135 is formed at one side of the bracket body 131. The mounting piece 135 is adapted to mount the adapter bracket 130 to a panel of a vehicle.

A rod guide 136 for guiding movement of the fixing rod 127 is formed in the bracket body 131. The rod guide 136 serves to guide movement of the fixing rod 127 by enclosing the fixing rod 127. The rod guide 136 may be formed in the mounting plate 112 of the inlet housing 111. A rod through-hole 136' passes through the bracket body 131 at a part where the rod guide 136 is connected to the bracket body 131. The rod through-hole 136' serves to communicate an interior of the driving source housing 137, which will be described below, with the penetration part 132.

The driving source housing 137 is formed at one side of the bracket body 131. A driving source 138 is positioned within the driving source housing 137, and a driving source cover 137' is provided to shield the driving source housing 137 from the outside. Power of the driving source 138 installed within the driving source housing 137 drives the fixing rod 127 passing through the rod through-hole 136'.

For reference, the driving source 138 may not be installed in the bracket body 131. The driving source 138 may be mounted to the mounting plate 112 of the inlet housing 111. Thereto, the mounting plate 112 should be larger than in the illustrated embodiment. In this case, the driving source 138 is situated at a location corresponding to the penetration part 132 of the bracket body 131.

Meanwhile, in the present invention, the driving source 138 not only provides power but also includes a configuration for converting the power into a linear reciprocal movement of the fixing rod 127. For example, it is defined in the specification that the driving source 138 includes a configuration for converting rotating power of the motor into a linear movement by using a pinion and a rack. The driving source 138 actually provides power by using various means such as a solenoid in addition to a motor. When a solenoid is used, a linear movement of the fixing rod 127 is directly achieved by the solenoid.

Next, only a main part of the plug connector 140 coupled to the inlet connector 110 will be described with reference to FIG. 10. The plug connector 140 is provided in a charging station, and the plug housing 141 forms an external appearance of the plug connector 140. A plug latch 142 is installed in the plug connector 140. The plug latch 142 is a part that is caught by the catching step 117 of the inlet connector 110 if the operator inserts the plug connector 140 into the inlet connector 110 while holding the plug connector 140. A tip end curved surface 143 is located at a tip end of the plug latch 142. The tip end curved surface 143 is a part that is guided by the catching step 117 when the plug latch 142 is moved to be caught by the catching step 117.

Hereinafter, an operation of the charging connector locking apparatus according to the embodiment of the present invention will be described.

FIG. 15A illustrates a state in which the plug latch 142 of the plug connector 140 has just entered the catching step 117 of the inlet connector 110. Then, the coupling latch 120 is installed to be spaced apart from the catching step 117 by a predetermined separation by the resilient member 124'. The fixing rod 127 is already moved toward the driving source 38. In this state, if a force is applied to the coupling latch 120, the coupling latch 120 is rotated while overcoming a resilient force of the resilient member 124'.

As illustrated in FIG. 15B, if the plug connector 140 continues to move toward the inlet connector 110, the tip end curved surface 143 of the plug latch 142 is guided along the catching step 117, and a tip end of the plug latch 142 pushes the interlocking piece 122 of the coupling latch 120 at a position after the catching step 117 (FIG. 15C). A tip end of the interlocking piece 122 extends to be downwardly inclined toward the front side and is pushed by a tip end of the plug latch 142, so that the coupling latch 120 is rotated about the rotary shaft 124 while overcoming a resilient force of the resilient member 124'.

If the interlocking piece 122 is pushed by the plug latch 142, a lower portion of the coupling latch 120 is located at an upper portion of the tip end of the plug latch 142. That is, the tip end of the plug latch 142 is located in the entry space 121' of the coupling latch 120. The tip end of the plug latch 142 is caught by the catching step 117. This state is illustrated in FIG. 15D.

For reference, in the state depicted in FIG. 15D, the coupling latch 120 is rotated about the rotary shaft 124 such that the positioning surface 125 is situated at a location where the positioning surface 125 can enter the fixing rod 127. For example, in the states of FIGS. 15A to 15C, the support end 126 prevents the fixing rod 127 from being introduced. This state is illustrated in FIG. 16A.

For reference, the state depicted in FIG. 15D is a state in which the fixing rod 127 is not yet moved. In this state, a terminal of the inlet connector 110 and a terminal of the plug connector 140 are coupled to and electrically connected to each other. If the electrical coupling is accomplished, the information is transmitted to the driving source 138 to operate the driving source 138.

If the driving source 138 is operated, the fixing rod 127 is moved forward. Thus, as illustrated in FIG. 16B, the tip end pushing part 128 is positioned on the positioning surface 125 of the coupling latch 120. If the tip end pushing part 128 of the fixing rod 127 is positioned on the positioning surface 125 of the coupling latch 120, rotation of the coupling latch 120 is prevented. Thus, the plug latch 142 is not operated even when a force is applied to the plug latch 142 because of the coupling latch 120.

This is because the fixing rod 127 pushes the positioning surface 125. In particular, since one surface of the fixing rod 127 is supported by the mounting plate 112 of the inlet housing 110 and an opposite surface thereof is supported by the support end 126 of the coupling latch 120, the coupling latch 120 can be prevented from being rotated.

Here, if the coupling latch 120 cannot be rotated, the plug latch 142 cannot be withdrawn from the catching step 117. If the plug latch 142 cannot be withdrawn from the catching step 117, the plug connector 140 cannot be separated from the inlet connector 110.

Meanwhile, when the fixing rod 127 directly prevents the plug latch 142 from being withdrawn from the catching step 117 without using the coupling latch 120, a tip end of the fixing rod 127 is raised by an operation in which the plug latch 142 is withdrawn from the catching step 117. If the fixing rod 127 is raised in this way, the force can be transferred to the driving source 138. Thus, since the force influences the connection between the fixing rod 127 and the driving source 138, the driving source 138 may be damaged. Thus, the coupling latch 120 can maintain a coupling state between the inlet connector 110 and the plug connector 140 without influencing the driving source 138.

Meanwhile, if the charging is completed, a charging completion signal is provided. The driving source 138 is operated in response to the signal. The fixing rod 127 moves away from the coupling latch 120 by an operation of the driving source 138. If the fixing rod 127 moves away from the coupling latch 120, the coupling latch 120 becomes rotatable. That is, it corresponds to the state depicted in FIG. 8A.

Figure 15:
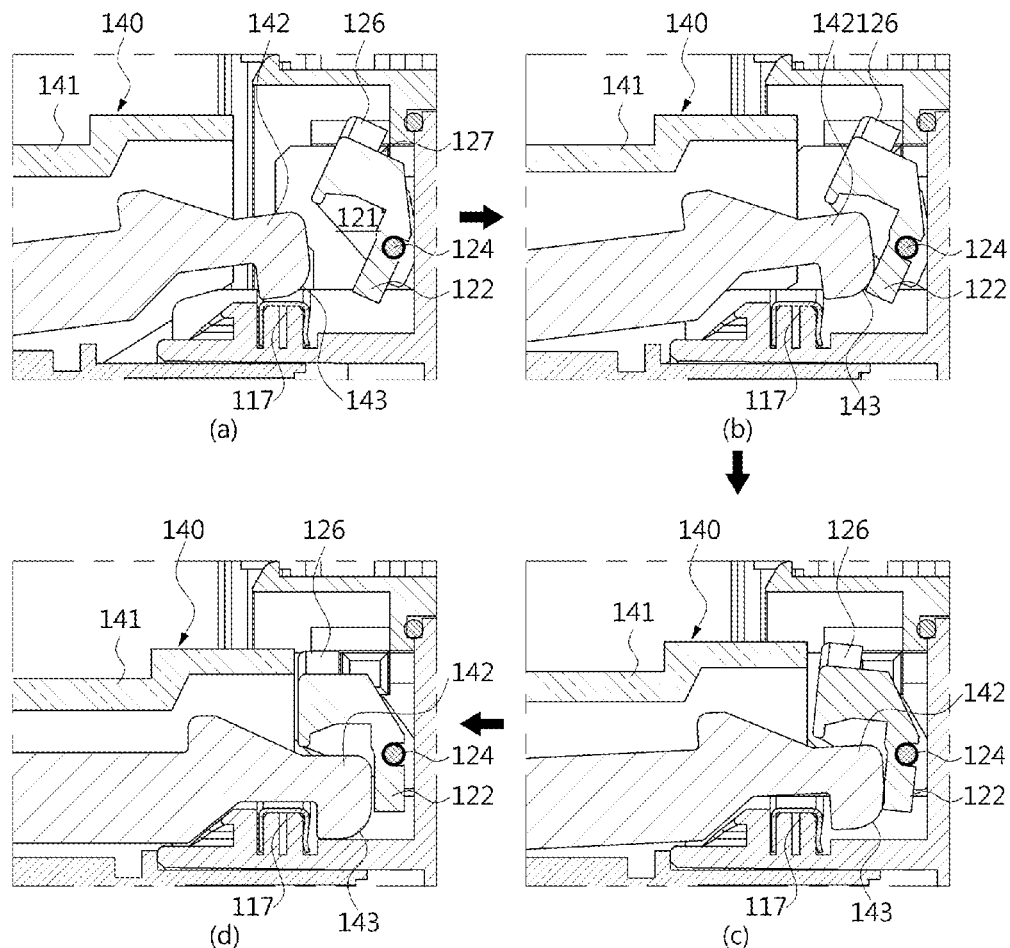
FIG. 15 is a view sequentially illustrating an operation of the coupling latch and a plug latch according to the other embodiment of the present invention.
Figure 16:
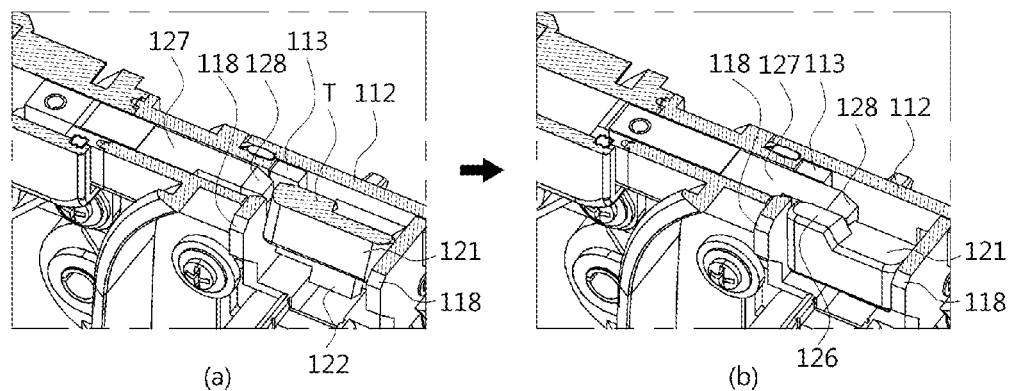
FIG. 16 is a view illustrating an operation of the fixing rod according to the other embodiment of the present invention.
Figure 17:
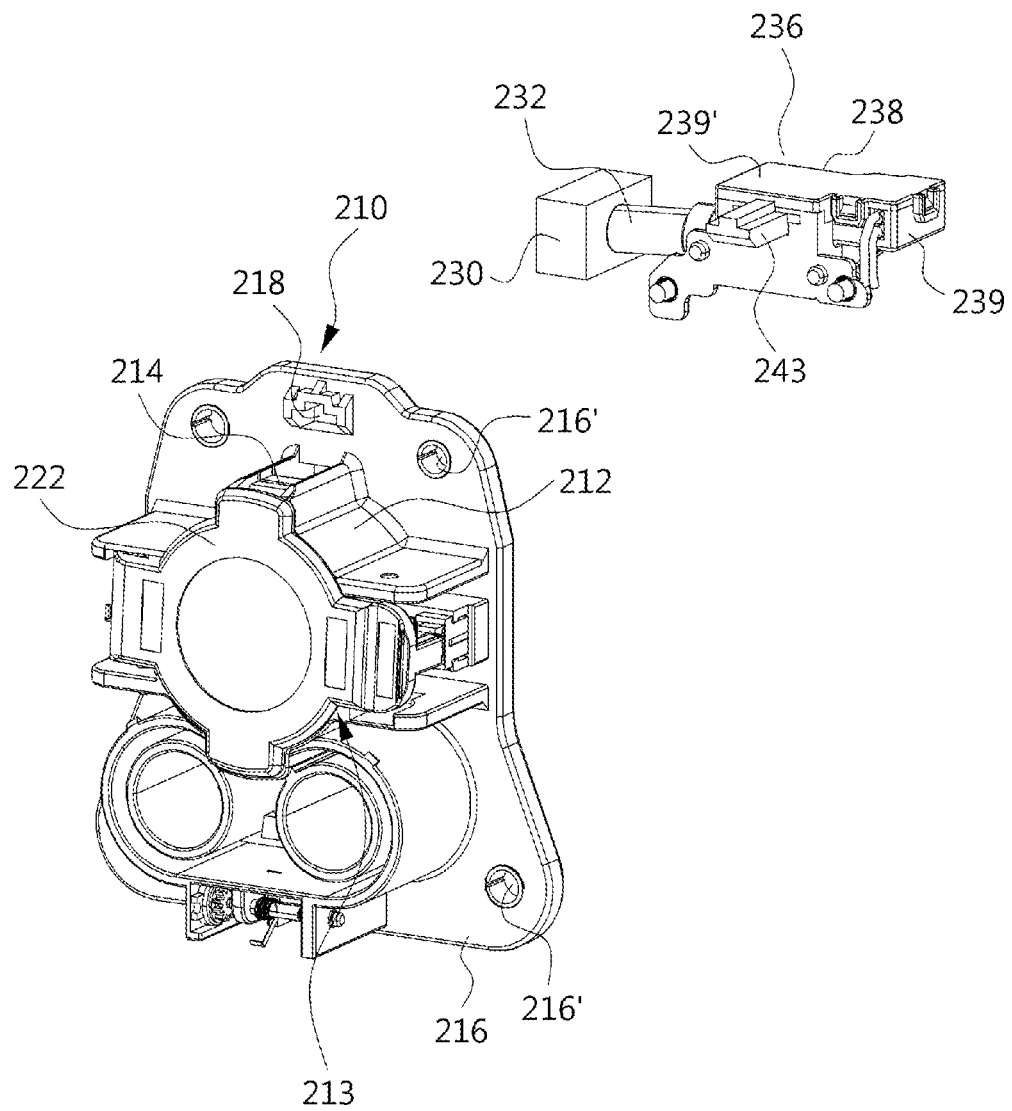
FIG. 17 is an exploded perspective view illustrating a main part of a charging connector locking apparatus according to another embodiment of the present invention.
Figure 18:
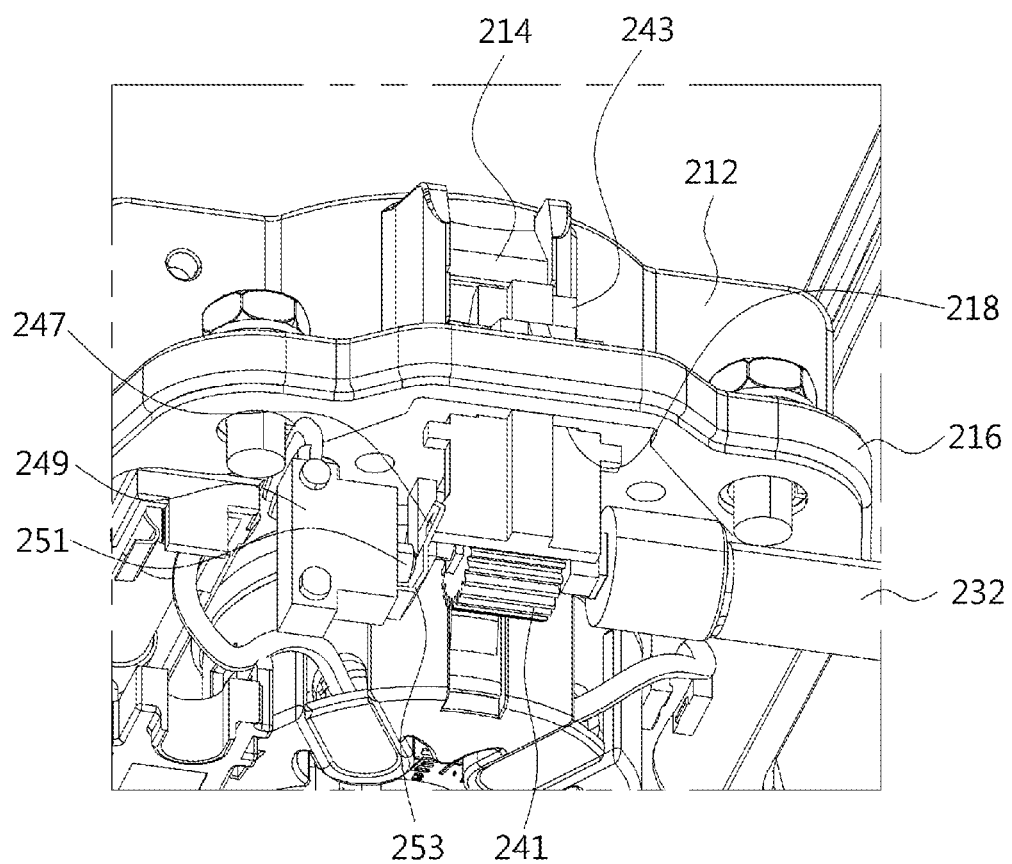
FIG. 18 is a perspective view illustrating a state in which a lever housing is mounted to an inlet connector while being removed in the embodiment of FIG. 17.

Since the coupling latch 120 can be rotated by a predetermined force or stronger in a state in which the fixing rod 127 deviates from the coupling latch 120, if the operator pushes the plug latch 142 while holding the plug connector 140, the plug latch 142 is withdrawn from the catching step 117 while the plug latch 142 and the coupling latch 120 are operated in a reverse sequence of FIG. 15 so that the plug connector 140 can be separated from the inlet connector 110.

Meanwhile, another embodiment of the present invention is illustrated in FIGS. 17 to 21. Here, as illustrated, an inlet connector 210 is adapted to charge a vehicle, and is a part mounted to a first panel 220 (see FIG. 19) located in the vehicle and to which a plug connector 224 (see FIG. 20) of a charging station is coupled. A connector housing 212 formed of an insulating synthetic resin forms an external appearance and a frame of the inlet connector 210. A plug coupling part 213 that is substantially cylindrical protrudes from the connector housing 212. The plug coupling part 213 is a part to which a plug connector 224, that is, a counterpart connector is coupled. A terminal positioning part (not illustrated) passes through an interior of the plug coupling part 213 forward and rearward. A terminal (not illustrated) is located in the terminal positioning part.

A latch catching step 214 is formed at one side of an outer surface of the plug coupling part 213. The latch catching step 214 is a part to which a plug latch 226 provided in a plug connector 224 of the charging station is coupled. The latch catching step 214 may be formed at one side of an outer surface of the connector housing 212.

A mounting plate 216 is provided on an outer surface of the connector housing 212 at an intermediate portion of the connector housing 212 in a forward/rearward direction thereof. The mounting plate 216 surrounds an outer surface of the connector housing 212 to protrude by a predetermined width in a plate shape. The mounting plate 216 is adapted to mount the connector housing 212 to the first panel 220. Thereto, a plurality of mounting holes 216' are formed in the mounting plate 216.

A lever through-hole 218 is formed in the mounting plate 216. The lever through-hole 218 is a part through which a locking lever 243 for locking the plug latch 226 of the plug connector 224 passes. The lever through-hole 218 is formed at a location corresponding to the latch catching step 214 on an outer surface of the connector housing 212. That is, when the connector housing 212 is viewed from the upper side in a plan view, an imaginary lengthwise extension line passes through the latch catching step 214 and the lever through-hole 218. The mounting plate 216 of the inlet connector 210 is mounted to the first panel 220 of the vehicle. The mounting plate 216 can be mounted to an outer surface of the first panel 220. Reference numeral 222 is a cover for blocking an inlet of the plug coupling part 213 when the plug coupling part 213 is not used.

Figure 19:
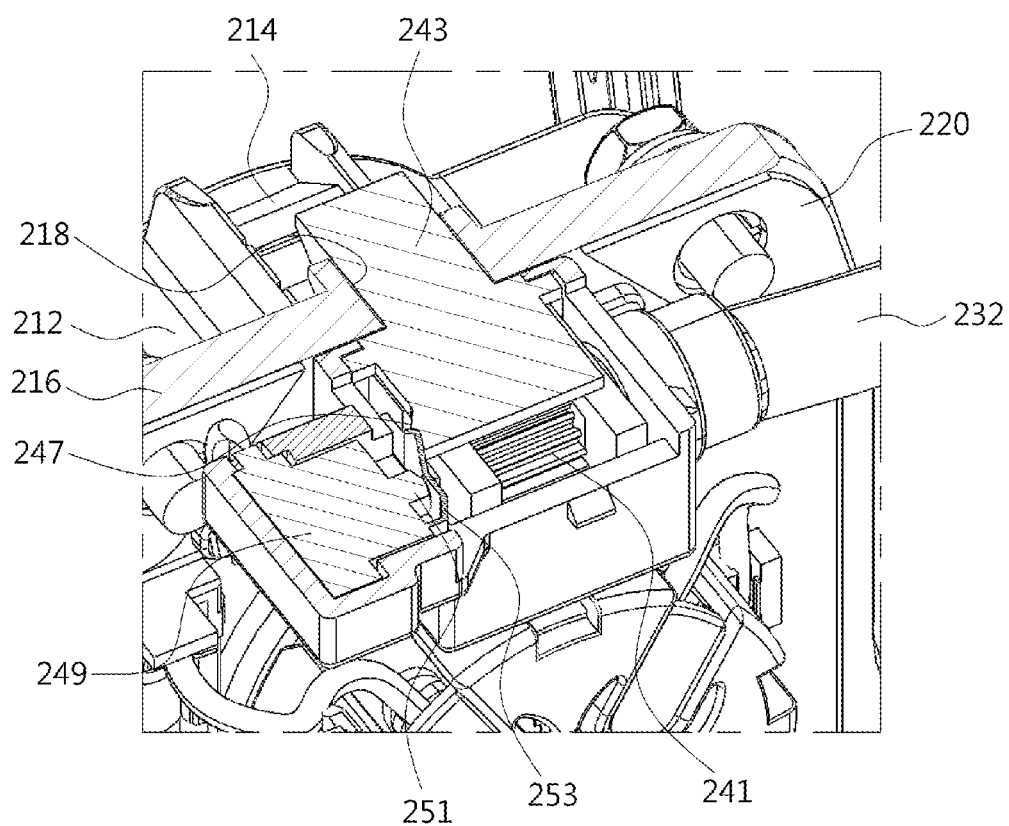
FIG. 19 is a partially sectional perspective view illustrating a main part of the charging connector locking apparatus of FIG. 17.
Figure 20:
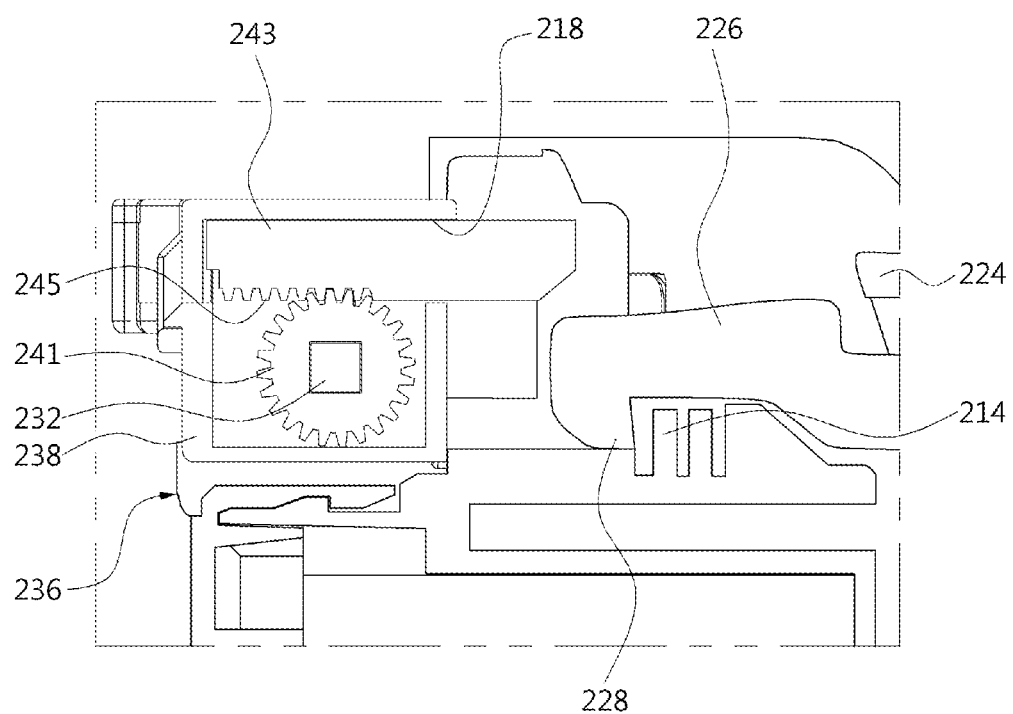
FIG. 20 is a view illustrating a state in which a locking lever is not operated in the embodiment of FIG. 17.

Meanwhile, only a part of the plug connector 224 coupled to the inlet connector 210 is illustrated in FIGS. 19 and 20 for convenience' sake. The plug connector 224 is located in the charging station, and is coupled to the inlet connector 210 to charge a battery of the vehicle. A plug latch 226 protrudes from an upper portion of a tip end of the plug connector 224, and is caught by a latch catching step 214 of the inlet connector 210. A latch step 228 protrudes from a tip end of the plug latch 226 to be caught by the latch catching step 214. If the plug connector 224 is inserted into and coupled to the inlet connector 210, the latch step 228 of the plug latch 226 is caught by the latch catching step 214 such that the inlet connector 210 and the plug connector 224 are coupled to each other.

Thus, as long as the latch step 228 is not separated from the latch catching step 214, the coupling between the inlet connector 210 and the plug connector 224 is not released. In order for the plug connector 224 to be separated from the inlet connector 210 after the charging is completed, the operator manipulates the plug latch 226 to separate the latch step 228 from the latch catching step 214.

A driving source 230 is provided in the embodiment of the present invention. In the embodiment of the present invention, only an output shaft 232 of the driving source 230 is illustrated. The driving source 230 is situated at a location corresponding to a rear surface of the first panel 220. Of course, a location of the driving source 230 may be varied according to a design condition. A reducer may be provided in the driving source 230. This is because most appropriate driving power can be output from the driving source 230. An example of the driving source includes an electrically driven motor.

An output shaft 232 of the driving source 230 is connected to a lever unit 236. The lever housing 238 forms an external appearance and a frame of the lever unit 236. A housing body 239 is enclosed by a housing cover 239' such that an interior space of the lever housing 238 is shielded from the outside. The lever housing 238 is a substantially flat hexahedral box shape. The housing body 239 has a box shape, an upper surface of which is opened, and the housing cover 239' covers the opened upper surface of the housing body 239 to shield the interior space. The output shaft 232 passes through the lever housing 238 to extend into the lever housing 238.

A pinion gear 241 is installed in the lever housing 238. The pinion gear 241 is connected to the output shaft 232 to be rotated by driving power of the driving source 230.

A locking lever 243 linearly moved forward and rearward in a lengthwise direction thereof by rotation of the pinion gear 241 is provided. A part of the locking lever 243 is located within the lever housing 238, and a tip end thereof passes through the lever housing to extend such that the tip end of the locking lever 243 is located in a lever through-hole 218 of the mounting plate 216. The locking lever 243 is movable into and out of the lever housing 238. A tip end of the locking lever 243 is normally located within the lever through-hole 218 of the mounting plate 216. If the locking lever 243 is operated by a driving source 230, the locking lever 243 passes through the lever through-hole 218 to be located above the plug latch 226 of the plug connector 224 such that rotation of the plug latch 226 can be prevented.

A rack gear part 245 engaged with a pinion gear 241 is formed in the locking lever 243 over a predetermined section. The rack gear part 245 receives a rotation of the pinion gear 241 such that the locking lever 243 is linearly moved.

A cam 247 is formed on a lengthwise surface of the locking lever 243. The cam 247 is adapted to detect an operation of the locking lever 243. Thereto, a switch 249 is provided within the lever housing 238 adjacent to the cam 247. A push button 251 is provided at one side of the switch 249, and a switch lever 253 for manipulating the push button 251 is provided. The switch lever 253 is operated in conjunction with the cam 247 of the locking lever 243. That is, if the locking lever 243 protrudes forward, the cam 247 is also moved to move the switch lever 253 so that the switch lever 253 pushes the push button 251. Accordingly, an operation of the locking lever 243 is detected by the switch 249 to be transmitted to a control unit of the vehicle.

Hereinafter, an operation of the charging connector locking apparatus according to the embodiment of the present invention will be described in detail.

In the embodiment, a front part of the mounting plate 216 of the inlet connector 210 is exposed to an outer surface of the first panel 220. Of course, a part of the connection housing 212 is located in the first panel 220.

The driving source 230 is operated and the locking lever 243 is moved forward after the plug connector 224 is coupled to the inlet connector 210 and the plug latch 226 is caught by the latch catching step 214. For example, after the user couples the plug connector 224 to the inlet connector 210, the driving source 230 can be operated by a signal of initiating charging through a manipulation necessary for the charging station. Of course, if it is detected that the plug connector 224 is coupled to the inlet connector 210, the driving source 230 is operated to move the locking lever 243 forward.

The forwardly moved locking lever 243 is moved rearward to an original position by providing reverse driving power of the driving source 230, and a signal may be provided by a necessary manipulation in the charging station after the charging or the driving source 230 may be operated by recognition of the charging by the control unit of the vehicle.

The plug connector 224 may be coupled to the inlet connector 210 for charging. As illustrated in FIG. 20, the plug latch 226 is caught by the latch catching step 214 if the coupling is completed. Accordingly, the plug connector 224 and the inlet connector 210 are coupled to each other so as not to be arbitrarily separated. Of course, if the plug latch 226 is manipulated, the plug latch 226 may be separated from the latch catching step 214.

However, since the plug connector 224 should not be arbitrarily separated from the inlet connector 210 during charging, the locking lever 243 is moved forward to prevent an operation of the plug latch 226. That is, if a manipulation for charging is performed or the plug connector 224 is coupled to the inlet connector 210, the driving source 230 is operated. If the driving source 230 provides driving power, the output shaft 232 is operated and the pinion gear 241 is rotated by an operation of the output shaft 232. If the pinion gear 241 is rotated, the locking lever 243 is operated in conjunction with the rack gear 245 of the locking lever 243 engaged with the pinion gear 241.

Figure 21:
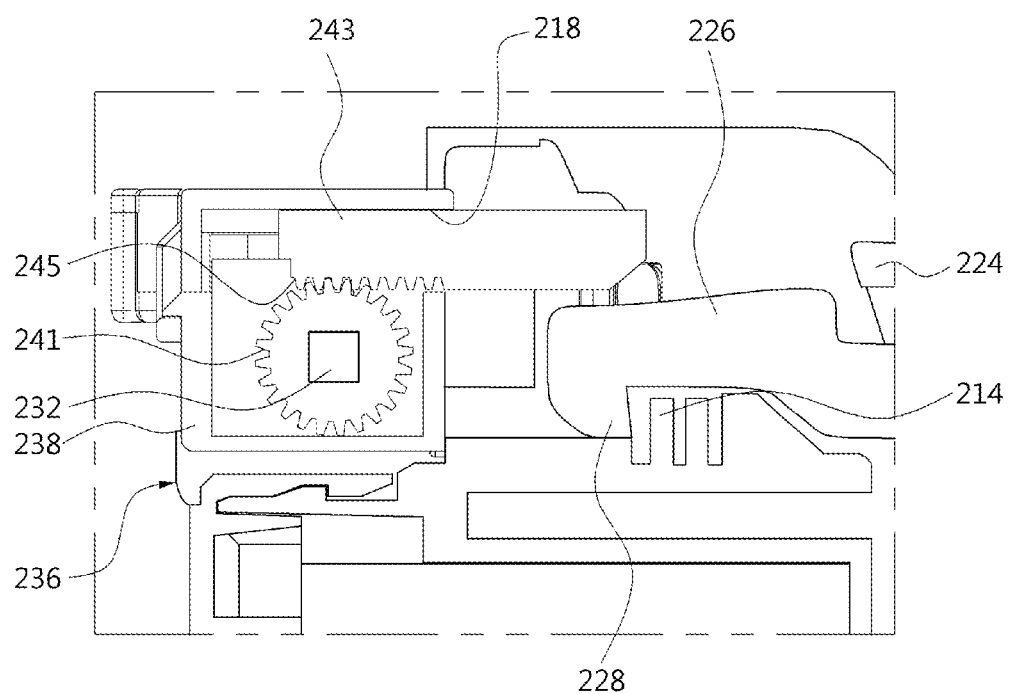
FIG. 21 is a view illustrating that the locking lever is moved forward to perform a locking operation in the embodiment of FIG. 17.

If the locking lever 243 is operated to be moved forward, a tip end of the locking lever 243 is located at an upper side of a tip end of the plug latch 226 as illustrated in FIG. 21 as the locking lever 243 protrudes from the lever through-hole 218. If a tip end of the locking lever 243 is located at an upper side of the tip end of the plug latch 226, the latch step 228 of the plug latch 226 is prevented from being rotated to be separated from the latch catching step 214. Thus, the plug latch 226 cannot be arbitrarily operated during the charging, so that the plug connector 224 can be perfectly prevented from being separated from the inlet connector 210 during the charging due to carelessness or a mistake of a user or a third person.

Meanwhile, if the charging is completed, the plug connector 224 should be separated from the inlet connector 210, in which case the user manipulates completion of the charging on the charging station or the control unit of the vehicle receives a signal of completing charging to operate the driving source 230. Then, the driving source 230 provides driving power whose direction is opposite to the preceding one to move the locking lever 243 rearward. If the locking lever 243 is moved rearward, a tip end of the locking lever 243 is located in the lever through-hole 218 and does not further hinder an operation of the plug latch 226.

In this state, the latch step 228 is separated from the latch catching step 214 by manipulating and rotating the plug latch 226, and the plug connector 224 is separated from the inlet connector 210.

A time point when an operation of the driving source 230 is started and then stopped is determined by detection of the switch 249. That is, as the cam 247 manipulates the switch lever 253 due to a forward/rearward movement of the locking lever 243, it may be detected whether the push button 251 is pushed or not so that a stop time point can be detected.

The scope of the present invention is not limited by the embodiments and is defined by the claims, and it is apparent that those skilled in the art to which the present invention pertains can variously modify and change the present invention without departing from the scope of the present invention.

For example, although the fixing rod 127 is manipulated by using the driving source 138 in the illustrated embodiment, the operator may directly manipulate the fixing rod 127. In this case, a part of the fixing rod 127 connected to the driving source 138 is exposed to the outside so that the operator may directly manipulate the fixing rod 127.

Although the pinion gear 241 and the rack gar 245 are used to operate the locking lever 243, the locking lever 243 is moved forward and rearward by a cam rotated by the output shaft 232 in the lever housing 238. Thereto, a resilient member that is apt to move the locking lever 243 in one direction may be provided. A rotary body rotated by the output shaft 232 is provided in the lever housing 238 and a boss of the rotary body may be caught by a recess of the locking lever 243 such that the locking lever 243 can be moved forward and rearward.

The switch 249 may not be provided in the lever unit 236. This is because an operation of the locking lever 243 can be detected by installing a configuration corresponding to the switch 249 outside the lever unit 236 or through another configuration. For example, a forward/rearward movement of the locking lever 243 may be confirmed by calculating the number of rotations of the driving source.

The lever unit 236 is positioned in a through-hole provided instead of the lever through-hole 218 of the mounting plate 216 such that one surface of the lever unit 236 can be exposed to the outside through the mounting plate 216. In this case, the locking lever 243 directly protrudes and extends from the lever housing 238 of the lever unit 236.

The present invention relates to a charging connector locking apparatus including an inlet connector and a plug connector, and can prevent the inlet connector and the plug connector from being separated from each other while the inlet connector and the plug connector are coupled to each other such that a battery is charged. Thus, the present invention can be applied to a vehicle for driving a motor by using a battery.

What is claimed is:

1. A charging connector locking apparatus for locking a state in which a plug latch of a plug connector is coupled to an inlet connector when the inlet connector is coupled to the plug connector for charging, the charging connector locking apparatus comprising:
  a coupling latch configured to be rotated while overcoming a resilient force of a resilient member and located adjacent to the plug latch due to an entry of the plug latch; and
  a fixing rod, wherein a tip end of the fixing rod is positioned at one side of the coupling latch such that the coupling latch is configured to be rotated by the plug latch and maintains a state in which the coupling latch is located adjacent to the plug latch to stop an operation of the plug latch.

2. The charging connector locking apparatus of claim 1, further comprising a driving source for providing driving power for movement of the fixing rod.

3. The charging connector locking apparatus of claim 2, wherein the driving source is located at one side of a mounting plate disposed in an inlet housing of the inlet connector, and the driving source is operated for a predetermined time period in a state in which the coupling of the inlet connector and the plug connector is completed and in a state in which the charging is completed.

4. The charging connector locking apparatus of claim 1, wherein the coupling latch is rotatably installed in a rotary shaft supported by the inlet housing to be supported by the resilient member.

5. The charging connector locking apparatus of claim 4, wherein the coupling latch includes a latch body, an interlocking piece extends from one side of the latch body to be downwardly inclined toward the plug connector, a positioning surface on which the tip end of the fixing rod is positioned is disposed on one surface of the latch body, and an entry space into which a tip end of the plug latch inserted is disposed at a lower portion of the latch body.

6. The charging connector locking apparatus of claim 5, wherein a support end protrudes adjacent to the positioning surface of the latch body such that when the plug latch is not introduced, the support end prevents the fixing rod from being positioned on the positioning surface.

7. The charging connector locking apparatus of claim 1, wherein the fixing rod extends in a direction parallel to a rotation center axis of the coupling latch, is guided along one side of an inlet housing of the inlet connector, and is supported by a support disposed in the inlet housing.

8. The charging connector locking apparatus of claim 7, wherein a catching step by which a tip end of the plug latch is caught protrudes from the inlet housing of the inlet connector at a location adjacent to the coupling latch, and guide ribs are provided disposed at opposite ends of the catching step.

9. The charging connector locking apparatus of claim 1, wherein an adapter bracket is disposed along a periphery of a mounting plate of an inlet housing of the inlet connector.

10. The charging connector locking apparatus of claim 9, wherein a bracket body of the adapter bracket is disposed along a periphery of the mounting plate to have a predetermined height, a penetration part through which a plug insertion part of the inlet housing is exposed is disposed to pass through a center of the bracket body, and a mounting piece for mounting the adapter bracket to a panel of a vehicle is disposed at one side of the bracket body.

11. The charging connector locking apparatus of claim 10, wherein a driving source housing in which a driving source is positioned is integrally attached at one side of the adapter bracket, and the fixing rod passes through the bracket body to communicate an interior of the driving source housing with the penetration part.

\* \* \* \* \*